(12) United States Patent
Matsumoto et al.

(10) Patent No.: US 7,991,419 B2
(45) Date of Patent: Aug. 2, 2011

(54) PRESS-TALK SERVER, TRANSCODER, AND COMMUNICATION SYSTEM

(75) Inventors: Norihisa Matsumoto, Fuchu (JP); Nodoka Mimura, Kunitachi (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 417 days.

(21) Appl. No.: 12/328,132

(22) Filed: Dec. 4, 2008

(65) Prior Publication Data

US 2009/0143029 A1  Jun. 4, 2009

(30) Foreign Application Priority Data

Dec. 4, 2007  (JP) ................ 2007-313510

(51) Int. Cl.
H04B 7/00 (2006.01)
H04B 1/38 (2006.01)
H04M 11/00 (2006.01)
H04M 11/04 (2006.01)
G06F 3/00 (2006.01)
G06F 9/44 (2006.01)
G06F 9/46 (2006.01)
G06F 13/00 (2006.01)

(52) U.S. Cl. ........ 455/518; 455/517; 455/519; 455/403; 455/404.1; 455/90.2; 719/328; 370/227

(58) Field of Classification Search .......... 455/517, 455/518, 519, 403, 404.1, 90.2; 719/328; 370/277

See application file for complete search history.

(56) References Cited

U.S. PATENT DOCUMENTS

| | | | |
|---|---|---|---|
| 7,170,863 B1* | 1/2007 | Denman et al. | 370/260 |
| 7,738,894 B2* | 6/2010 | Sung et al. | 455/518 |
| 7,747,270 B2* | 6/2010 | Schwagmann et al. | 455/519 |
| 2003/0190926 A1* | 10/2003 | Harris et al. | 455/522 |
| 2006/0025165 A1* | 2/2006 | Tillet et al. | 455/517 |
| 2007/0183350 A1* | 8/2007 | Walker et al. | 370/310 |
| 2009/0054010 A1* | 2/2009 | Shaffer et al. | 455/90.2 |
| 2009/0137263 A1* | 5/2009 | Abbate et al. | 455/518 |
| 2009/0233596 A1* | 9/2009 | Calabrese | 455/426.1 |
| 2009/0280850 A1* | 11/2009 | Mathur et al. | 455/518 |
| 2010/0136943 A1* | 6/2010 | Hirvela et al. | 455/404.1 |
| 2010/0137006 A1* | 6/2010 | Rofougaran | 455/457 |
| 2010/0190518 A1* | 7/2010 | Lindner et al. | 455/518 |
| 2010/0248772 A1* | 9/2010 | Denman et al. | 455/518 |
| 2010/0261497 A1* | 10/2010 | Cooper et al. | 455/519 |

* cited by examiner

Primary Examiner — Lewis G West
Assistant Examiner — Bobbak Safaipour
(74) Attorney, Agent, or Firm — Antonelli, Terry, Stout & Kraus, LLP.

(57) ABSTRACT

When half-duplex many-to-many communication is performed among a plurality of mobile stations having different codecs in a single group, transcoding is performed with a small number of codec circuits. A transcoder manages an SSRC of a received RTP packet, detaches voice information from a jitter buffer, which is identical to a latest SSRC, and inputs the detached voice information to a codec circuit. As the latest SSRC is switched, a voice sending station subject to transcode is switched, and mobile stations using the same codec share the codec circuit. Therefore, in a half-duplex many-to-many communication (group communication) system, called a professional mobile radio system, push-talk, or press-talk, it is not necessary to switch the transcoder until a radio station which takes a talk burst is changed during a single call (call session).

17 Claims, 28 Drawing Sheets

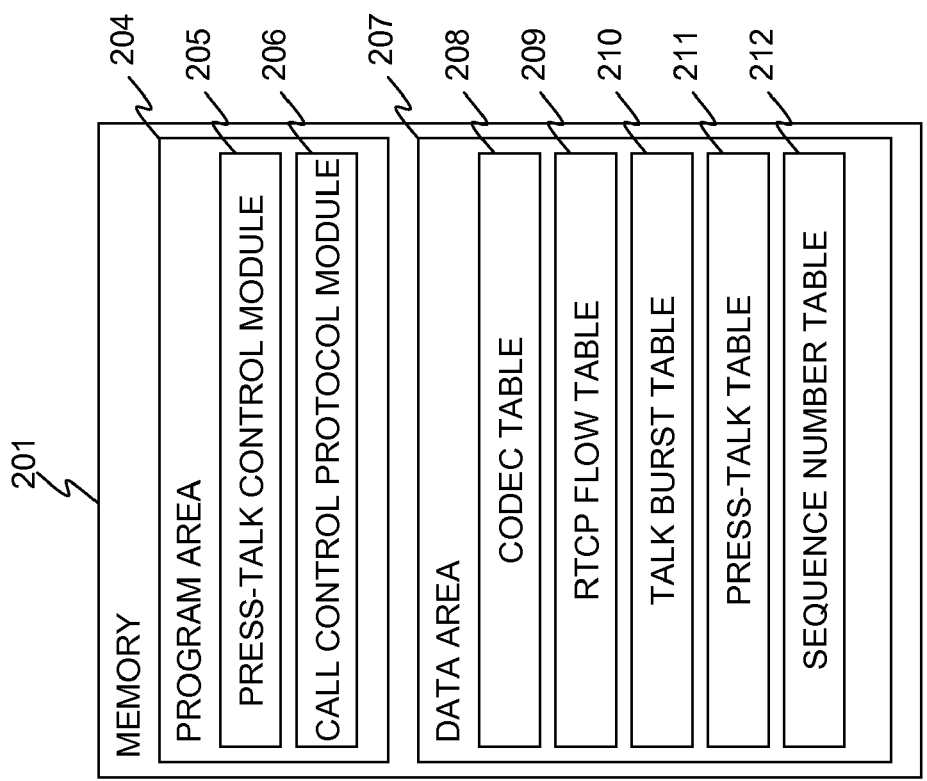
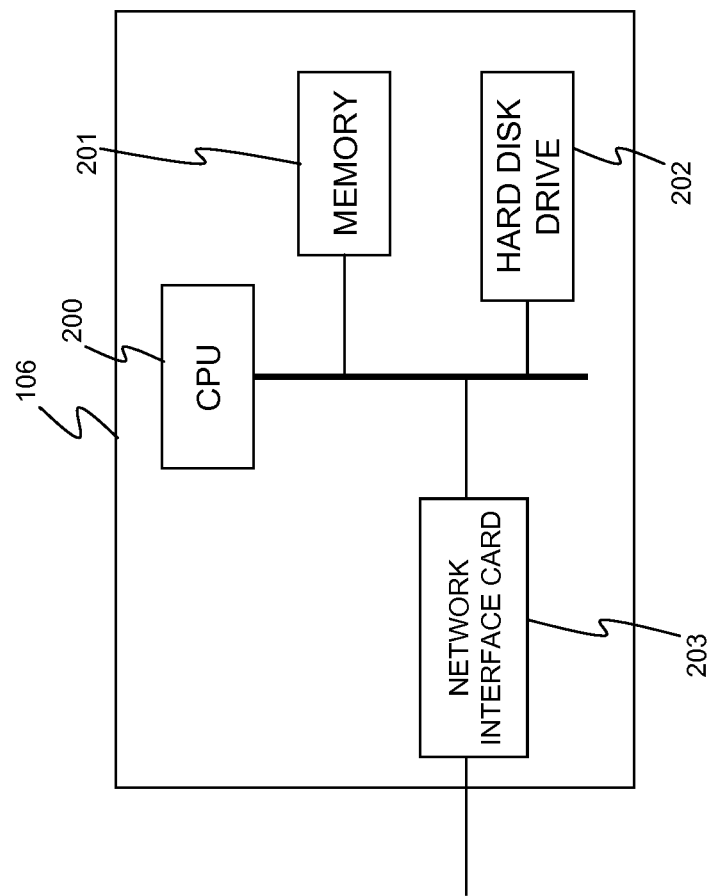
FIG.2

(CODEC TABLE)

| TRANSCODER | CODEC TYPE | RTP CLOCK RATE |
|---|---|---|
| transcoder.netA | A | 8000Hz |
|  | B | 8000Hz |
|  | C | 8000Hz |
|  | D | 8000Hz |

FIG.3

(RTCP FLOW TABLE) 209

| CALL GROUP | RTP GATEWAY | | PRESS-TALK SERVER | | RTCP GATEWAY | | PRESS-TALK SERVER | |
|---|---|---|---|---|---|---|---|---|
| | IP ADDRESS 401 | UDP PORT 402 | IP ADDRESS 403 | UDP PORT 404 | IP ADDRESS 406 | UDP PORT 407 | IP ADDRESS 409 | UDP PORT 410 |
| 0003@ptserver.netA | GATEWAY a | 10000 | PRESS-TALK SERVER | 30001 | GATEWAY a | 10010 | PRESS-TALK SERVER | 30011 |
| | GATEWAY b | 40001 | PRESS-TALK SERVER | 30001 | GATEWAY b | 40011 | PRESS-TALK SERVER | 30011 |
| | GATEWAY b | 40002 | PRESS-TALK SERVER | 30002 | GATEWAY b | 40012 | PRESS-TALK SERVER | 30012 |

(TALK BURST TABLE) 210

| CALL GROUP 420 | SOURCE IP ADDRESS 421 | SOURCE UDP PORT 422 | DESTINATION IP ADDRESS 423 | DESTINATION UDP PORT 424 | SSRC 425 |
|---|---|---|---|---|---|
| 0003@ptserver.netA | GATEWAY a | 10000 | PRESS-TALK SERVER | 30001 | 1111 |

FIG.4

(PRESS-TALK TABLE)

| CALL GROUP | RECEIVED PACKET INFORMATION | | | CODEC | NUMBER OF MOBILE STATIONS | TRANSMISSION PACKET INFORMATION | | | |
|---|---|---|---|---|---|---|---|---|---|
| | SOURCE IP ADDRESS | SOURCE UDP PORT | DESTINATION IP ADDRESS | DESTINATION UDP PORT | | | SOURCE IP ADDRESS | SOURCE UDP PORT | DESTINATION IP ADDRESS | DESTINATION UDP PORT |

Note: header above corresponds to columns 501–512.

| CALL GROUP | SOURCE IP ADDRESS | SOURCE UDP PORT | DESTINATION IP ADDRESS | DESTINATION UDP PORT | CODEC | NUMBER OF MOBILE STATIONS | SOURCE IP ADDRESS | SOURCE UDP PORT | DESTINATION IP ADDRESS | DESTINATION UDP PORT |
|---|---|---|---|---|---|---|---|---|---|---|
| 0003@ptserver.netA | GATEWAY a | 10000 | PRESS-TALK SERVER | 30001 | A | 1 | PRESS-TALK SERVER | 30001 | GATEWAY b | 40001 |
| | | | | | | | PRESS-TALK SERVER | 33001 | TRANSCODER | 44001 |
| | GATEWAY b | 40001 | PRESS-TALK SERVER | 30001 | A | 1 | PRESS-TALK SERVER | 30001 | GATEWAY a | 10000 |
| | | | | | | | PRESS-TALK SERVER | 33001 | TRANSCODER | 44001 |
| | GATEWAY b | 40002 | PRESS-TALK SERVER | 30002 | B | 1 | PRESS-TALK SERVER | 33002 | TRANSCODER | 44002 |
| | TRANSCODER | 44001 | PRESS-TALK SERVER | 33001 | A | 1 | PRESS-TALK SERVER | 30001 | GATEWAY a | 10000 |
| | | | | | | | PRESS-TALK SERVER | 30001 | GATEWAY b | 40001 |
| | TRANSCODER | 44002 | PRESS-TALK SERVER | 33002 | B | 1 | PRESS-TALK SERVER | 30002 | GATEWAY b | 40002 |

(SEQUENCE NUMBER TABLE)

| CALL GROUP | SEQUENCE NUMBER |
|---|---|
| 0003@ptserver.netA | S |

FIG.5

(CODEC RESOURCE MANAGEMENT TABLE)

| CODEC TYPE | FRAME RATE | RTP CLOCK RATE | RESOURCE AMOUNT | | USAGE | |
| --- | --- | --- | --- | --- | --- | --- |
| | | | ENCODER | DECODER | ENCODER | DECODER |
| A | 40ms/frame | 8000Hz | 30 | 30 | 15 | 15 |
| B | 40ms/frame | 8000Hz | 30 | 30 | 15 | 15 |
| C | 20ms/frame | 8000Hz | 30 | 30 | 2 | 2 |
| D | 20ms/frame | 8000Hz | 30 | 30 | 7 | 7 |

(CODEC IN USE MAP)

| | | | | | |
| --- | --- | --- | --- | --- | --- |
| A001 | A002 | ... | | | |
| ... | | | | | |
| A101 | A102 | ... | | | |
| ... | | | | | |
| B001 | B002 | ... | | | |
| ... | | | | | |

FIG.8

(RTP FLOW TABLE)

| CALL GROUP | TRANSCODER | | PRESS-TALK SERVER | | CODEC |
|---|---|---|---|---|---|
| | IP ADDRESS | UDP PORT | IP ADDRESS | UDP PORT | |
| 0003@ptserver.netA | TRANS-CODER | 44001 | PRESS-TALK SERVER | 33001 | A |
| | TRANS-CODER | 44002 | PRESS-TALK SERVER | 33002 | B |

707 — 900, 901, 902, 903, 904, 905, 906, 907

(TRANSCODE TABLE)

| CALL GROUP | PRESS-TALK SERVER UDP PORT | DECODER ID | ENCODER ID | TRANSCODER UDP PORT |
|---|---|---|---|---|
| 0003@ptserver.netA | 33001 | A001 | B103 | 44002 |
| | 33002 | B003 | A101 | 44001 |

| MOBILE STATION ADDRESS | CODEC TYPE | RTP CLOCK RATE |
| --- | --- | --- |
| ms1@netA | A | 8000Hz |
| ms2@netA | B | 8000Hz |
| ms3@netA | A | 8000Hz |

| | |
|---|---|
| MESSAGE: OK RESPONSE | ← 1810 |
| From: 0003@ptserver.netA | ← 1811 |
| To: ms2@netA | ← 1812 |
| . . . | |
| UDP PORT: 40001<br>CODEC: A, 8000Hz<br>RTCP: 40011 | ← 1813a |
| UDP PORT: 40002<br>CODEC: B, 8000Hz<br>RTCP: 40012 | ← 1813b |
| ADDRESS LIST:<br>  CODEC A<br>    ms3@netA<br>  CODEC B<br>    ms2@netA | ← 1814 |

1320

| | |
|---|---|
| MESSAGE: INVITE | ← 1800 |
| From: 0003@ptserver.netA | ← 1801 |
| To: ms2@netA | ← 1802 |
| . . . | |
| UDP PORT: 30001<br>CODEC: A, 8000Hz<br>RTCP: 30011 | ← 1803a |
| UDP PORT: 30002<br>CODEC: B, 8000Hz<br>RTCP: 30012 | ← 1803b |
| UDP PORT: 30003<br>CODEC: C, 8000Hz<br>RTCP: 30013 | ← 1803c |
| UDP PORT: 30004<br>CODEC: D, 8000Hz<br>RTCP: 30014 | ← 1803d |
| ADDRESS LIST:<br>  ms2@netA<br>  ms3@netA | ← 1804 |

FIG.18

PRESS-TALK SERVER, TRANSCODER, AND COMMUNICATION SYSTEM

CLAIM OF PRIORITY

The present application claims priority from Japanese patent application JP 2007-313510 filed on Dec. 4, 2007, the content of which is hereby incorporated by reference into this application.

BACKGROUND OF THE INVENTION

1. Field of the Invention

The present invention relates to a communication system, in which a plurality of mobile stations perform half-duplex many-to-many communication, and to a press-talk server and a transcoder in the communication system. In particular, the present invention relates to a communication system, such as a professional mobile radio system, in which a plurality of mobile stations participating in a call have different codecs, to a transcoder, and to a press-talk server.

2. Description of the Related Art

In public services, a professional mobile radio system provides a half-duplex many-to-many communication (group communication), called press-talk communication. The outline of the press-talk call will now be described.

If a mobile station calls a group identified by a group number, a press-talk server connects a call among a plurality of mobile stations as group members. Each of the plurality of mobile stations participating in the call receives every voice sent from other group members. In order to send voice, a user of a mobile station has to press a button in the mobile station to request the press-talk server for a voice talk burst, and has to be permitted to send a talk burst. The press-talk server performs exclusive talk burst control such that only one mobile station takes a talk burst in the group at a time. A user who requests a talk burst is noticed the permission of the talk burst by a buzzer or lamp lighting and sends voice. The press-talk server delivers the sent voice to other group members. The user who sent voice releases the pressed button when the user finished talking. A talk burst release indication is received by the press-talk server, and the press-talk server waits for a next talk burst request. If a caller requests call disconnection, the call is terminated.

In general, mobile stations use the same codec in a system. For this reason, in case of communication between the mobile stations, transcoding is not required. However, a terminal, such as a dispatch console, which is connected to the press-talk server in a wired manner, uses an ITU-T G.711 codec different from the codec of the mobile stations. For this reason, in case of communication between a mobile station and a wired terminal, transcoding is required. Even in case of communication between the mobile stations, when the mobile stations belong to different systems or when codecs to be used are different, transcoding is required.

The reason why the mobile station and the wired terminal use different codecs is as follows. That is, while the mobile station uses a codec of a low bit rate such that voice information may be transmitted even in a narrow radio band, the wired terminal requires a function to mix voice of a plurality of press-talk calls and simultaneously output the mixed voice, and as a result uses a PCM-based codec such that PCM (Pulse-Code Modulation) as a voice signal after being mixed may be reproduced without deteriorating voice quality.

Transcoding for communication between the mobile station and the wired terminal is performed on a base station line interface card in the press-talk server. In the base station line interface card, a codec circuit exists for a mobile station which performs communication through the base station line. Voice from the mobile station is transcoded by the codec circuit for the mobile station, and is sent to the wired terminal. Voice from the wired terminal is transcoded by the codec circuit, and is sent to the mobile station through a channel and the base station.

As another technique, a PoC (Push-to-talk over Cellular) for a third generation mobile phone service is known. The PoC implements a press-talk call among mobile phones using the same codec over IP. Typically, a press-talk call among mobile stations using different codecs is impossible and nor required. The reason is as follows. That is, the 3GPP (The 3rd Generation Partnership Project) and the 3GPP2 are unifying the codecs of the mobile stations, and each communication carrier provides PoC service only to its subscribers whose terminals conform to 3GPP or 3GPP2 standards. Furthermore, a mixing service like that of a wired terminal in a professional mobile radio system is not required.

As yet another technique, a media server for a conference call over IP telephone is known. A conference call over IP telephone is a full-duplex many-to-many call. If a conference call is generated, the media server simultaneously receives voice packets from all terminals participating in the call, and classifies the voice packets in a dejitter buffer (hereinafter, simply referred to as a jitter buffer) of each terminal. Voice of each terminal is converted to PCM by a codec circuit allocated to the jitter buffer, and mixed. The mixed voice is converted by the codec of the terminal again, and is sent to the terminal. The codec circuit allocated to the jitter buffer is decided per call.

Non-patent Document 1: "System Development for Push Talk Service" NTT DoCoMo Technical Journal, Vol. 13, No. 4 is an example of related art.

SUMMARY OF THE INVENTION

When mobile stations for existing professional mobile radio systems having different codecs depending on the system are accommodated in a common press-talk server regardless of the difference in the codec, and a press-talk call is performed, it is necessary to reduce the number of codec circuits required by the press-talk server.

Similarly to the existing professional mobile radio system, in a method that provides codec circuits according to the number of mobile stations over a base station, a small number of press-talk calls among mobile stations having different codec are performed, many codec circuits are not used and thus it is inefficient. This problem also occurs in the existing professional mobile radio system.

Similarly to the media server for the conference call over IP telephones, in a method that provided codec circuits according to the number of mobile stations participating in a press-talk call, what is necessary is that codec circuits are provided according to the number of mobile stations participating in press-talk calls, which are simultaneously performed and require transcoding, regardless of the number of mobile stations over a base station. During a single press-talk call, however, only a codec circuit coupled to a jitter buffer corresponding to a mobile station having a talk burst is actually used, and a codec circuit of a jitter buffer corresponding to another station processes mute data.

The invention has been finalized in view of the drawbacks inherent in the related art, and it is an object of the invention to provide a communication system that, in a half-duplex many-to-many communication (group communication) system, called a professional mobile radio system, push talk, or press talk, causes a transcoder so as not to be switched until a single radio station, which takes a talk burst, is changed during a single call (call session), and a press-talk server and a transcoder for a communication system.

In the invention, during a single press-talk call, a plurality of mobile stations using the same codec share a single codec circuit. To this end, in the invention, a transcoder identifies whether or not a plurality of sending stations sending voice information are the same, for successive coding conversion of the voice information, selects one sending station during one call, identifies a coding system of voice information of the selected sending station, and selects a coding conversion unit (codec) that performs coding conversion based on the identified coding system. A plurality of coding conversion units having different coding systems are provided.

The transcoder identifies whether or not a plurality of sending stations sending voice information are the same, for successive coding conversion of the voice information, selects one sending station during one call, identifies a coding system of voice information of the selected sending station, and selects a coding conversion unit that performs coding conversion based on the identified coding system. A plurality of coding conversion units having different coding systems are provided. Therefore, coding conversion of voice information from a plurality of radio stations having the same coding system during one call can be performed by one coding conversion unit.

When the press-talk server transfers voice information from a radio station to the transcoder, the press-talk server gives successive sequence numbers during one call, and the transcoder stores an identifier of the selected sending station and a latest sequence number of voice information during one call. When the stored sequence number of newly received voice information is larger than the latest sequence number, and an identifier of a sending station in the newly received voice information is different from the stored identifier of the sending station, for successive coding conversion of the voice information, the sending station sending the newly received voice information can be selected.

According to the first solving means of the present invention, there is provided a press-talk server in a communication system which achieves a half-duplex many-to-many call among a plurality of radio stations, the press-talk server which delivers voice information sent by a sending station as a radio station, which requests a talk burst, to a plurality of other radio stations through a gateway and a base station while passing or without passing through a transcoder, wherein if a packet is received, the press-talk server searches a press-talk table that stores call group identification information as an identifier of a press-talk call, received packet information indicating socket information of a packet to be receivable by a call of a call group, a coding system, and transmission packet information indicating socket information of a packet carrying voice information of a radio station, which is currently taking the talk burst, and checks whether an entry identical to the socket information of the received packet exists in the received packet information, if an entry exists, the press-talk server determines whether a source address of the received packet is an address of the gateway or an address of the transcoder, when the received packet is a packet from the gateway, for the call group identification information, the press-talk server refers to a talk burst table that stores socket information of a packet, and a talk burst request identifier for identifying a radio station, which is currently taking the talk burst, when the socket information of the received packet and the talk burst request identifier in the received packet are identical to the entries of the talk burst table, the press-talk server determines that the received packet is a packet which is to be delivered to other group members, the press-talk server refers to the press-talk table, according to transmission packet information corresponding to the received packet information of the received packet, copies the received packet if the transmission packet information has a plurality of socket information, and creates a transmission packet to the gateway and/or transcoder, when the created transmission packet is to be transmitted to the transcoder, the press-talk server refers to a sequence number table that stores a sequence number to be added to a packet when being transmitted to the transcoder in association with the call group identification information, inserts the sequence number into the transmission packet, and increments the sequence number of the sequence number table, and the press-talk server sends the completed transmission packet.

According to the second solving means of the present invention, there is provided a transcoder in the communication system which achieves a half-duplex many-to-many call among a plurality of radio stations, by a press-talk server which delivers voice information sent by a sending station as a radio station, which requests a talk burst, to a plurality of other radio stations through a gateway and a base station while passing or without passing through the transcoder, wherein:

on the basis of a packet received from the press-talk server, the transcoder refers to a jitter buffer that stores, with respect to call group identification information, a port number of the press-talk server, a received sequence number, and a talk burst request identifier for identifying a radio station, which is expected to currently have a talk burst, (a) when the port number of the press-talk server and the talk burst request identifier stored in the jitter buffer are not identical to a port number of the press-talk server and a talk burst request identifier of the received packet, (i) if the received sequence number of the jitter buffer is more up-to-date than the sequence number of the received packet, the transcoder determines that, after a radio station which has taken the talk burst is switched, an old packet before being switched is received, and discards the packet, and (ii) if the received sequence number of the jitter buffer is 0 or null, the transcoder determines that the received packet is an initial packet after press-talk call setup, or if the sequence number of the received packet is more up-to-date than the received sequence number of the jitter buffer, the transcoder determines that the received packet is an initial packet after the ratio station which has taken the talk burst is switched, the transcoder copies the value of the sequence number of the received packet to the received sequence number of the jitter buffer, and copies the talk burst request identifier of the received packet to the talk burst request identifier of the jitter buffer, thereby newly construct a buffer of the jitter buffer, and (b) when the port number of the press-talk server and the talk burst request identifier stored in the jitter buffer are identical to the port number of the press-talk server and the talk burst request identifier in the received packet, the transcoder compares the sequence number of the received packet and the received sequence number of the jitter buffer, if the sequence number of the received packet is larger, sets the value of the sequence number of the received packet in the received sequence number of the jitter buffer, inserts the received packet in an input wait queue of an input buffer to a coding conversion unit so as to be arranged in ascending order of a timestamp from the head of the queue, and converts the received packet from a first coding system to a second coding system by the coding conversion unit.

According to the third solving means of the present invention, there is provided a communication system which achieves a half-duplex many-to-many call among a plurality of radio stations, by a press-talk server that delivers voice information sent by a sending station as a radio station, which requests a talk burst, to a plurality of other radio stations through a gateway and a base station while passing or without passing through a transcoder, wherein if a packet is received, the press-talk server searches a press-talk table that stores call group identification information as an identifier of a press-talk call, received packet information indicating socket information of a packet to be receivable by a call of a call group, a coding system, and transmission packet information indicating socket information of a packet carrying voice information of a radio station, which is currently taking the talk burst, and checks whether an entry identical to the socket information of the received packet exists in the received packet information, if an entry exists, the press-talk server determines whether a source address of the received packet is an address of the gateway or an address of the transcoder, when the received packet is a packet from the gateway, for the call group identification information, the press-talk server refers to a talk burst table that stores socket information of a packet, and a talk burst request identifier for identifying a radio station, which is currently taking the talk burst, when the socket information of the received packet and the talk burst request identifier in the received packet are identical to the entries of the talk burst table, the press-talk server determines that the received packet is a packet which is to be delivered to other group members, the press-talk server refers to the press-talk table, according to transmission packet information corresponding to the received packet information of the received packet, copies the received packet if the transmission packet information has a plurality of socket information, and creates a transmission packet to the gateway and/or transcoder, when the created transmission packet is to be transmitted to the transcoder, the press-talk server refers to a sequence number table that stores a sequence number to be added to a packet when being transmitted to the transcoder in association with the call group identification information, inserts the sequence number into the transmission packet, and increments the sequence number of the sequence number table, and the press-talk server sends the completed transmission packet, and wherein on the basis of a packet received from the press-talk server, the transcoder refers to a jitter buffer that stores, with respect to call group identification information, a port number of the press-talk server, a received sequence number, and a talk burst request identifier for identifying a radio station, which is expected to currently have a talk burst, (a) when the port number of the press-talk server and the talk burst request identifier stored in the jitter buffer are not identical to a port number of the press-talk server and a talk burst request identifier of the received packet, (i) if the received sequence number of the jitter buffer is more up-to-date than the sequence number of the received packet, the transcoder determines that, after a radio station which has taken the talk burst is switched, an old packet before being switched is received, and discards the packet, and (ii) if the received sequence number of the jitter buffer is 0 or null, the transcoder determines that the received packet is an initial packet after press-talk call setup, or if the sequence number of the received packet is more up-to-date than the received sequence number of the jitter buffer, the transcoder determines that the received packet is an initial packet after the ratio station which has taken the talk burst is switched, the transcoder copies the value of the sequence number of the received packet to the received sequence number of the jitter buffer, and copies the talk burst request identifier of the received packet to the talk burst request identifier of the jitter buffer, thereby newly construct a buffer of the jitter buffer, and (b) when the port number of the press-talk server and the talk burst request identifier stored in the jitter buffer are identical to the port number of the press-talk server and the talk burst request identifier in the received packet, the transcoder compares the sequence number of the received packet and the received sequence number of the jitter buffer, if the sequence number of the received packet is larger, sets the value of the sequence number of the received packet in the received sequence number of the jitter buffer, inserts the received packet in an input wait queue of an input buffer to a coding conversion unit so as to be arranged in ascending order of a timestamp from the head of the queue, and converts the received packet from a first coding system to a second coding system by the coding conversion unit.

According to the invention, during a single press-talk call, a plurality of stations using the same codec share a single codec circuit. Therefore, the number of codec circuits to be used in the single press-talk call depends on the number of codec types to be used, and as a result, the number of codec circuits can be significantly reduced, as compared with the related art.

According to the invention, it is possible to provide a communication that, in a half-duplex many-to-many communication (group communication) system, called a professional mobile radio system, push-talk, or press-talk, allows a transcoder so as not to be switched until a radio station which takes a talk burst is changed during a single call (call session), and a press-talk server and a transcoder for a communication system.

BRIEF DESCRIPTION OF THE DRAWINGS

FIG. 2 is a diagram showing the configuration of a press-talk server;

FIG. 3 is a diagram of a codec table;

FIG. 4 is a diagram of an RTCP flow table and a talk burst table;

FIG. 5 is a diagram of a press-talk table and a sequence number table;

FIG. 8 is a diagram of a codec resource management table and a codec in use map;

FIG. 9 is a diagram of an RTP flow table and a transcode table;

FIG. 11 is a diagram of a mobile station codec table of a call control server;

FIG. 18 is a diagram showing the formats of an incoming message and a response message to be transmitted and received between a press-talk server and a gateway;

DETAILED DESCRIPTION OF THE INVENTION

First, a network configuration, a server configuration, and a message sequence will be described. Next, a voice packet transcoding procedure will be described with reference to flowcharts and tables. Finally, initialization of the tables (which is mainly executed during call setup) will be described with reference to flowcharts and tables.

1. System Configuration

Figure 1:
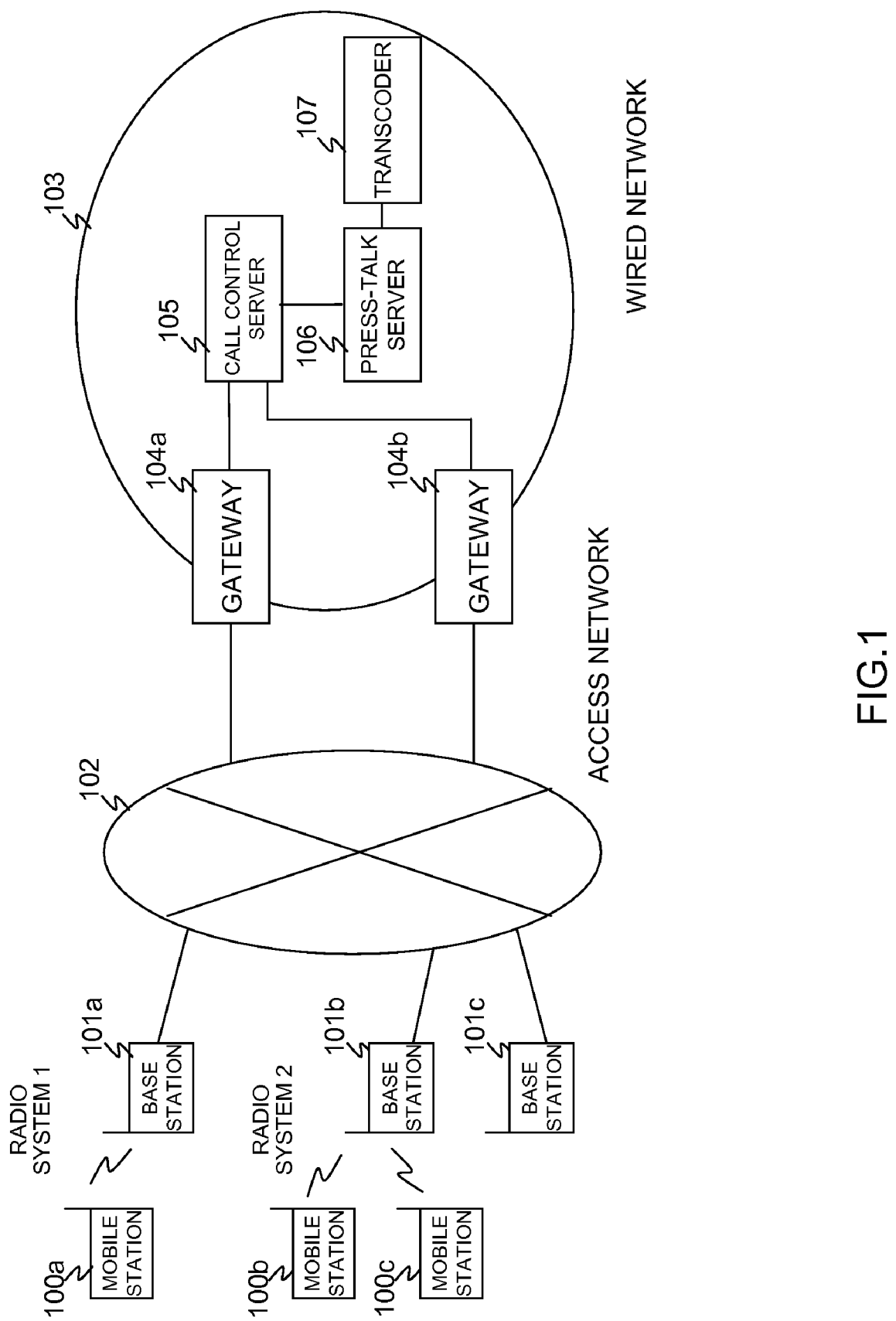
FIG. 1 is a diagram showing the network configuration of a professional mobile radio system.

FIG. 1 is a diagram showing the network configuration of a professional mobile radio system in which this embodiment is applicable.

A mobile station 100a uses a radio system 1, and performs communication with a base station 101a. Mobile stations 100b and 100c use a radio system 2 and perform communication with a base station 101b. The base stations 101a, 101b, and 101c are connected to an access network 102. The access network 102 is connected to gateways 104a and 104b. The gateways 104a and 104b are gateways of a wired network 103. The gateways 104a and 104b converts an ISDN protocol (however, IP is used in a lower layer) to be used by the access network to an SIP protocol to be used by the wired network 103. Therefore, the gateways 104a and 104b have a virtual SIP terminal function corresponding to the mobile stations thereunder. In the wired network 103, a call control server 105, a press-talk server 106, and a transcoder 107 exist. The call control server 105 routes an SIP message between the gateways 104a and 104b and the press-talk server 106. The press-talk server 106 performs press-talk call setup, call release, talk burst control, and copy and delivery of a voice flow. The transcoder 107 transcodes the voice flow received from the press-talk server 106, and sends the transcoded voice flow to the press-talk server 106 again. The press-talk server 106 and the transcoder 107 are essential parts of this embodiment. It is assumed that the base station 101a is logically under the gateway 104a. That is, the base station 101a performs communication with the gateway 104a, but does not perform communication with the gateway 104b. It is assumed that the base stations 101b and 101c are logically under the gateway 104b.

FIG. 2 is a configuration diagram of the press-talk server 106.

The press-talk server 106 includes a CPU 200, a memory 201, a hard disk drive 202, and a network interface card 203. The CPU 200 is a central processing unit which executes a program stored in the memory 201. The memory 201 has a program area 204 and a data area 207. A press-talk control module 205 and a call control protocol module 206 are loaded onto the CPU 200 and appropriately executed. The CPU 200 accesses tables in the data area 207, and appropriately reads out and/or writes data with respect to the tables.

The hard disk drive 202 stores data desired to hold regardless of whether power is turned on or off. The network interface card 203 is an interface circuit for communication with the gateways 104a and 104b, the call control server 105, and the transcoder 107.

The program area 204 has a press-talk control module 205 and a call control protocol module 206. The press-talk control module 205 performs press-talk call setup, call release, talk burst control, and copy and delivery of a voice flow. The call control protocol module 206 controls an SIP (Session Initiation Protocol) protocol. The data area 207 has a codec table 208, an RTCP (Realtime Transport Control Protocol) flow table 209, a talk burst table 210, a press-talk table 211, and a sequence number table 212.

FIG. 3 shows the codec table 208.

The codec table 208 has registered types of codecs to be supported by the transcoder 107 (see FIG. 3). The codec table 208 stores, for transcoder 300, codec type 301 and RTP clock rate 302 in advance. The transcoder 300 stores the address of the transcoder 107. The codec type 301 stores the type of the codec supported by the transcoder 107. The RTP clock rate 302 stores an increase (if 8000 Hz, 8000) per second of a timestamp set in a voice packet for every codec type. This table is configured in the press-talk server 106 when a person for maintenance constructs a professional mobile radio system.

FIG. 4 (upper view) is a diagram of an RTCP flow table.

The RTCP flow table 209 stores RTP (Realtime Transport Protocol) flow 401 of voice and RTCP flow 406 of talk burst control between the press-talk server 106 and the gateways 104a 104b. For call group 400, the RTCP flow table 209 stores gateway IP address 402 and UDP (User Datagram Protocol) port 403 and press-talk server IP address 404 and UDP port 405 with respect to the RTP 401, and gateway IP address 407 and UDP port 408 and press-talk server IP address 409 and UDP port 410 with respect to the RTCP 406. The RTCP flow table 209 can be stored, for example, when a press-talk call request is processed.

FIG. 4 (lower view) is a diagram of a talk burst table.

The talk burst table 210 manages an RTP flow of a mobile station with a talk burst granted. For call group 420, the talk burst table 210 records socket information (source IP address 421, source UDP port 422, destination IP address 423, and destination UDP port 424) and SSRC (talk burst request identifier) (Synchronization Source) 425, which is identification information for identifying a mobile station which requests a talk burst. The SSRC may be selected by a random number or may be calculated by a mobile station address. In this embodiment, a mobile station address is not necessarily specified only by the SSRC, and the group members may use different SSRCs. The talk burst table 210 can be stored, for example, when a talk burst request is processed.

The call group 420 is an identifier of a press-talk call. The source IP address 421, the source UDP port 422, the destination IP address 423, and the destination UDP port 424 indicate socket information an RTP packet that carries voice information of a mobile station which currently takes a talk burst. The SSRC 425 is the SSRC of the mobile station which currently takes a talk burst.

FIG. 5 (upper view) is a diagram of a press-talk table.

The press-talk table 211 manages the destination of the RTP flow received from the gateways 104*a* and 104*b* and the transcoder 107 (see FIG. 5). For call group 500, the press-talk table 211 stores received packet information 502, codec 506, number of mobile stations (MSs) 507, and transmission packet information 509. The number of MSs is, for example, the number of originating mobile stations. The press-talk table 211 is configured, for example, when a press-talk call request is processed.

The call group 500 is an identifier of a press-talk call. The received packet information 502 indicates socket information of all RTP packets to be receivable by the call of the call group 500. That is, the received packet information 502 has recorded a source IP address 501, a source UDP port 503, a destination IP address 504, and a destination UDP port 505. The transmission packet information 509 indicates socket information of all RTP packets to be transmitted for the call of individual received packet information of the call group 500. That is, the transmission packet information 509 has recorded a source IP address 508, a source UDP port 510, a destination IP address 511, and a destination UDP port 512.

FIG. 5 (lower view) is a diagram of a sequence number table.

The sequence number table 212 is used to give successive sequence numbers in the same press-talk call when the press-talk server 106 transfers RTP packets to the transcoder 107. The sequence number table 212 stores sequence number 521 for call group 520. In FIG. 5, the call group 520 of the sequence number table 212 is an identifier of a press-talk call. The sequence number 521 indicates a sequence number added to a packet when an RTP packet of the call group 520 is transferred to the transcoder 107.

Figure 6:
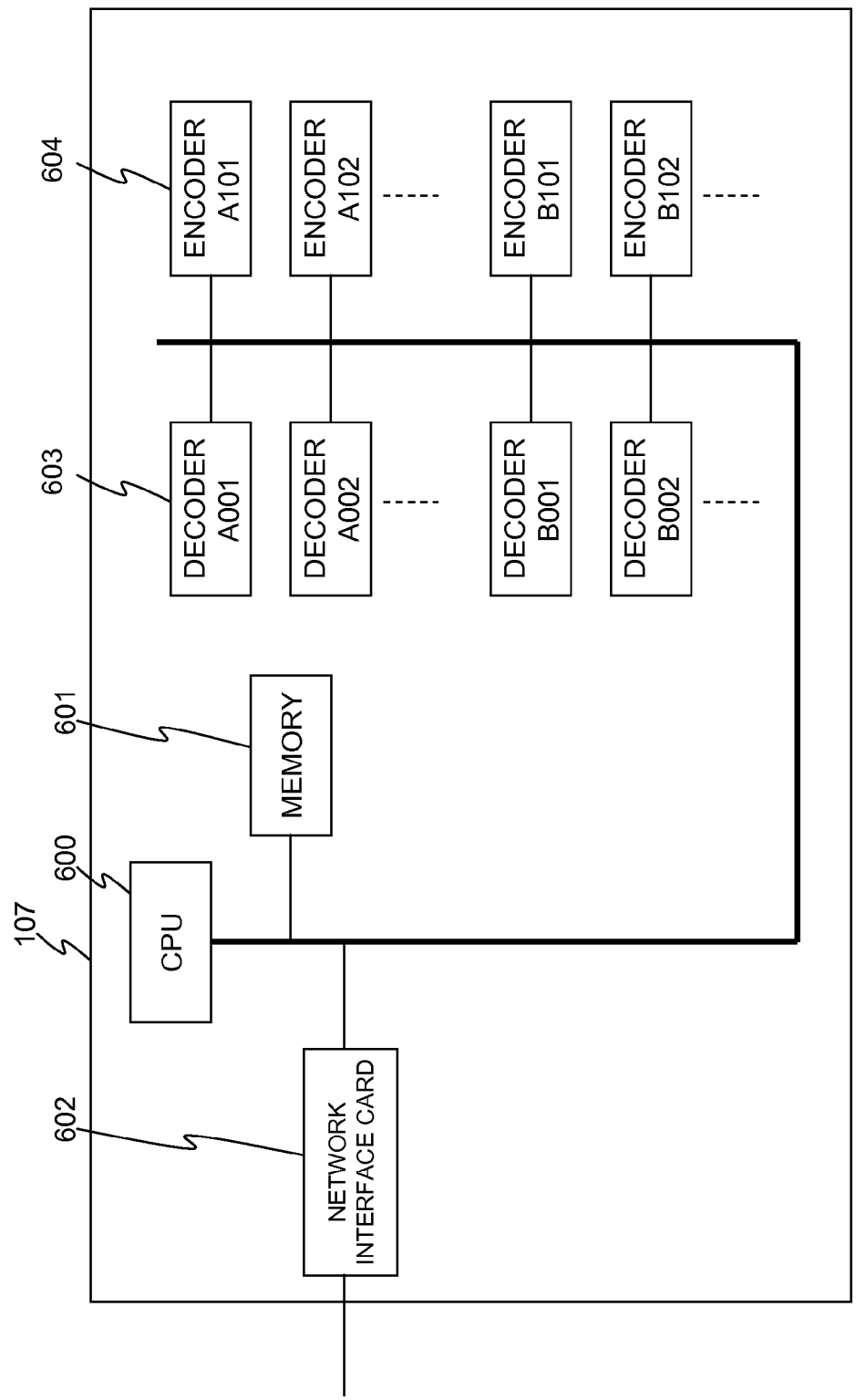
FIG. 6 is a diagram showing the hardware configuration of a transcoder.

FIG. 6 is a configuration diagram of the transcoder 107.

The transcoder 107 includes a CPU 600, a memory 601, a network interface card 602, a decoder 603, and an encoder 604. The CPU 600 is a central processing unit which executes a program stored in the memory 601. The network interface card 602 is an interface circuit for communication with the press-talk server 106.

The decoder 603 converts voice data received from the press-talk server 106 to PCM. Referring to FIG. 6, a decoder A001 and a decoder A002 have a codec A. A decoder B001 and a decoder B002 have a codec B. The encoder 604 encodes voice data PCM-converted by the decoder 603 to a codec for a mobile station. Referring to FIG. 6, encoders A101 and A102 have a codec A. Encoders B101 and B102 have a codec B. As will be apparent from FIG. 6, the transcoder 107 has a plurality of decoders and encoders per codec type. For this reason, when a press-talk call is generated, the transcode control module 702 dynamically allocates a decoder and an encoder to be used, and releases the allocated decoder and encoder at the end of the call. A codec in use map 706 indicates whether or not a decoder and an encoder are allocated for every circuit. For example, when a press-talk call in which 10 mobile stations having a codec A and 5 mobile stations having a codec B participate, one of decoders A, one of encoders A, one of decoders B, and one of encoders B are allocated. This is one of essential parts of this embodiment. (10 decoders A, 10 encoders A, 5 decoders B, and 5 encoders B are not allocated.)

Figure 7:
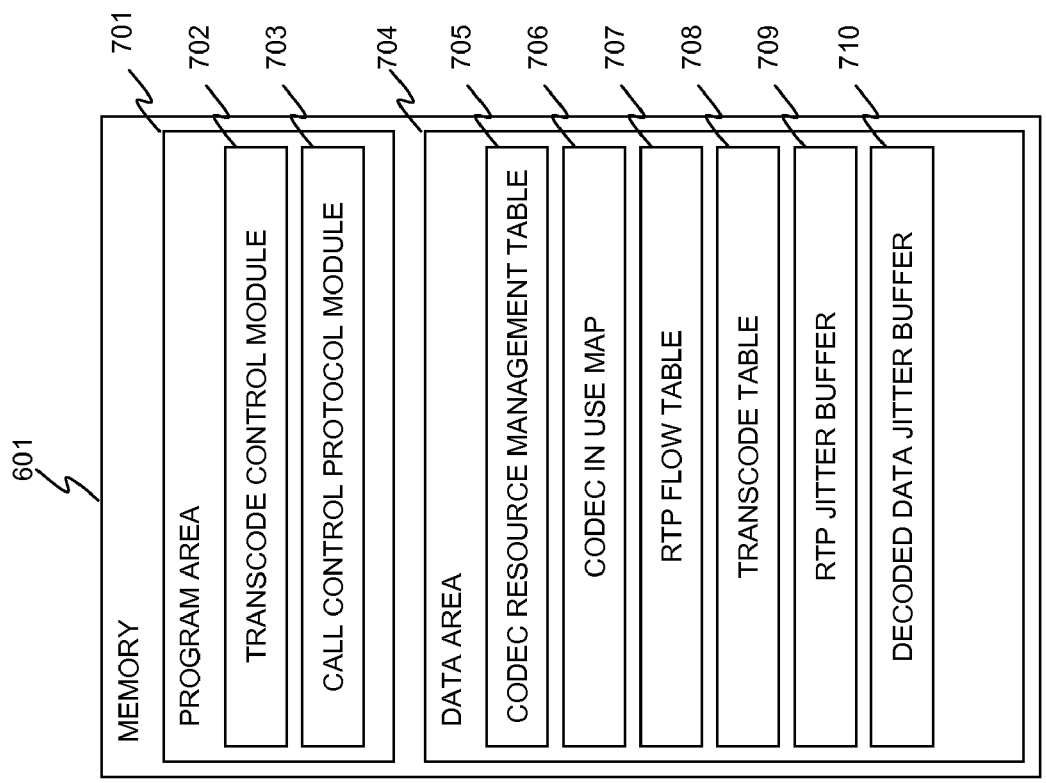
FIG. 7 is a diagram showing the internal configuration of a memory in a transcoder.

FIG. 7 is a diagram showing the internal configuration of a memory in a transcoder.

The memory 601 has a program area 701 and a data area 704. A transcode control module 702 and call control protocol module 703 are loaded onto the CPU 600 and appropriately executed. The CPU 600 accesses tables and buffers in the data area 704, and appropriately reads out and/or writes data with respect to the tables and buffers.

The program area 701 has a transcode control module 702 and a call control protocol module 703. The transcode control module 702 performs transcoding pattern configuration, codec circuit allocation, and jitter buffer control in response to press-talk call setup. The call control protocol module 703 controls an SIP protocol. The data area 704 has a codec resource management table 705, a codec in use map 706, an RTP flow table 707, a transcode table 708, an RTP jitter buffer 709, and a decoded data jitter buffer 710.

FIG. 8 (upper view) is a diagram of a codec resource management table.

The codec resource management table 705 manages the number of circuits in the transcoder 107 and codec types. For codec type 800, the codec resource management table 705 has recorded frame rate 808, RTP clock rate 801, resource amount 803 (encoder 802 and decoder 803), and usage 805 (encoder 806 and decoder 807).

FIG. 8 (lower view) is a diagram of a codec in use map.

The codec in use map 706 is a bit map indicating whether or a codec circuit is in use or unused. The codec in use map 706 stores the use states (for example, ON or OFF, or 1 or 0) of the decoders A001, A002, . . . , and the decoders B001, B002, . . . .

FIG. 9 (upper view) is a diagram of an RTP flow table.

The RTP flow table 707 manages a codec type of an RTP flow between the transcoder 107 and the press-talk server 106. For call group 900, the RTP flow table 707 stores IP address 901 and UDP port 903 of transcoder 902, and IP address 905 and UDP port 906 of press-talk server 904, and codec 907. The call group 900 is an identifier of a press-talk call. In the transcoder 902 and the press-talk server 904, socket information of an RTP flow per codec 907 is configured. That is, an IP address and a UDP port number of the transcoder 107 are set in the IP address 901 and the UDP port 903, respectively, and an IP address and a UDP port number of the press-talk server 106 are set in the IP address 905 and the UDP port 906, respectively.

FIG. 9 (lower view) is a diagram of a transcode table.

The transcode table 708 manages to which codec circuit an RTP flow received from the press-talk server 106 is input and from which UDP port the RTP flow is output to the press-talk server 106. For call group 910, the transcode table 708 stores press-talk server UDP port 911, decoder ID 912, encoder ID 913, and transcoder UDP port 914.

The call group 910 is an identifier of a press-talk call. The press-talk server UDP port 911 is identical to the UDP port 906 of the RTP flow table 707. The decoder ID 912 indicates a decoder to which a received RTP flow of the press-talk server UDP port 911 is to be input. The encoder ID 913 indicates an encoder to which PCM voice information output from a decoder identified by the decoder ID 912 is to be input.

The transcoder UDP port 914 indicates an RTP flow to send voice information output from an encoder identified by the encoder ID 913.

Figure 10:
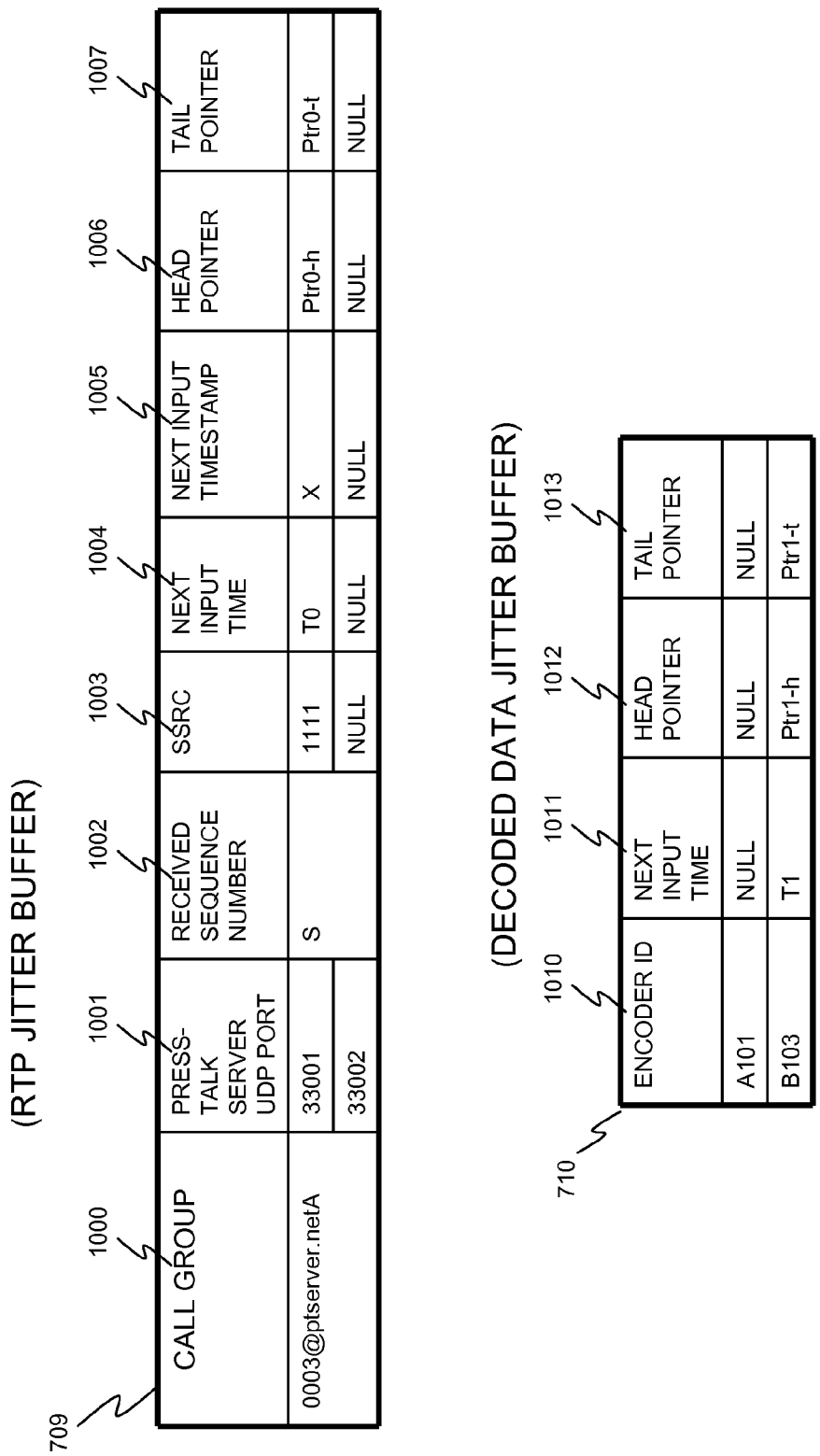
FIG. 10 is a diagram of an RTP jitter buffer and a decoded data jitter buffer.

FIG. 10 (upper view) is a diagram of an RTP jitter buffer.

The RTP jitter buffer 709 stores a voice packet from a mobile station with a talk burst granted for a predetermined time, dejitters, and reorders the packets. For call group 1000, the RTP jitter buffer 709 stores press-talk server UDP port 1001, received sequence number 1002, SSRC 1003, next input time 1004, next input timestamp 1005, head pointer 1006, and tail pointer 1007. The call group 1000 is an identifier of a press-talk call. The press-talk server UDP port 1001 is identical to the UDP port 906 of the RTP flow table 707.

FIG. 10 (lower view) is a diagram of a decoded data jitter buffer.

The decoded data jitter buffer 710 stores data subjected to a decoding procedure, which is a first half of transcoding, for a predetermined time and dejitters during the decoding procedure. For encoder ID 1010, the decoded data jitter buffer 710 stores next input time 1011, head pointer 1012, and tail pointer 1013.

The encoder ID 1010 indicates an encoder to which PCM voice information is to be input. The next input time 1011 indicates a time at which voice information is to be next input to an encoder. The head pointer 1012 is a pointer to the head of a queue in which PCM voice information to be input to an encoder identified by the encoder ID 1010 is ordered in an output sequence from a decoder. The tail pointer 1013 is a pointer to voice information at the tail of the queue.

FIG. 11 is a diagram of a mobile station codec table of a call control server.

For mobile station address 1111, a mobile station codec table 1100 includes codec type 1112 and RTP clock rate 1113. The codec type 1112 indicates the type of a codec to be used by a mobile station. The RTP clock rate 1113 indicates an increase (if 8000 Hz, 8000) per second of a timestamp in a voice packet. The mobile station codec table 1100 can be configured when or before mobile station location registration is processed.

2. Sequence Diagram 2-1. Location Registration

Next, a message sequence will be described.

Figure 12:
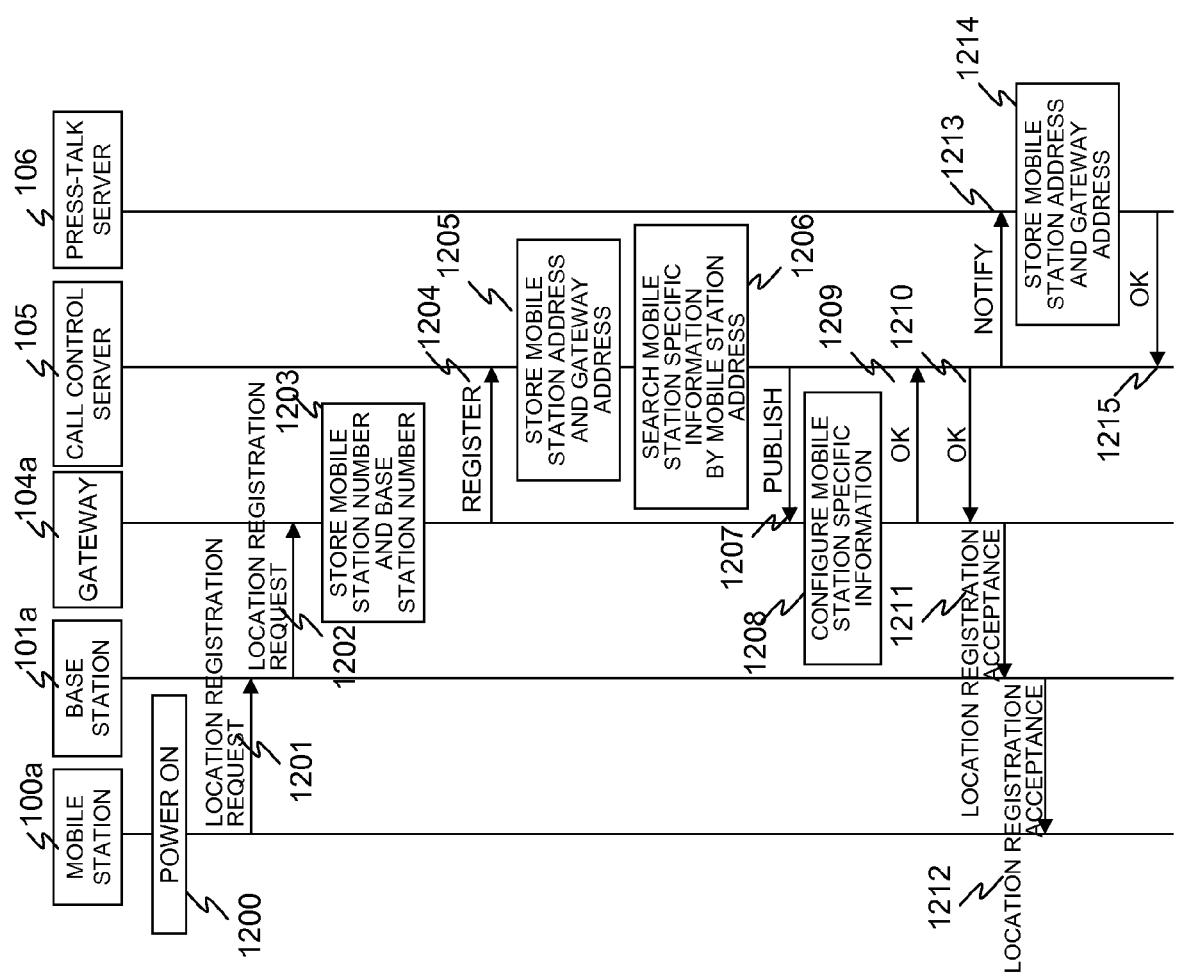
FIG. 12 is a sequence diagram of location registration.

FIG. 12 is a sequence diagram of location registration which is required before a mobile station performs a press-talk call.

If the mobile station 100*a* is turned on (Step 1200), a location registration request message 1201 including a mobile station number is sent to the base station 101*a*. The base station 101*a* sends a location registration request message 1202 to the gateway 104*a*. The gateway 104*a* stores the mobile station number of the mobile station 100*a* and the base station number of the base station 101*a* (Step 1203). Next, a virtual SIP terminal function corresponding to the mobile station number starts, a mobile station address is created by the mobile station number, and a REGISTER message 1204 including the mobile station address is sent to the call control server 105. As the mobile station address, for example, "mobile station number@domain name" is used. The call control server 105 stores the address of the gateway 104*a*, which is the source of the REGISTER message 1204, and the mobile station address (Step 1205). Next, mobile station specific information is searched by the mobile station address (Step 1206). In this case, the codec of the mobile station is searched from the mobile station codec table 1100 (see FIG. 11).

From FIG. 11, it can be seen that, if the mobile station 100*a* is ms1@netA, the codec A is used, and the RTP clock rate is 8000 Hz. The call control server 105 configures information including the codec type 1112 and the RTP clock rate 1113 in a PUBLISH message 1207 and sends the PUBLISH message 1207 to the gateway 104*a*.

In Step 1208, the gateway 104*a* has the same table as the mobile station codec table 1100 of the call control server 105, and creates the table for the mobile station 100*a*. The gateway 104*a* sends an OK response 1209 for the PUBLISH message 1207 to the call control server 105. The call control server 105 sends OK response 1210 for the REGISTER message 1204 to the gateway 104*a*. The call control server 105 also sends a NOTIFY message 1213 to the press-talk server 106, and notifies that the location of the mobile station 100*a* is registered under the gateway 104*a*. The press-talk server 106 stores the mobile station address of the mobile station 100*a* and the address of the gateway 104*a* in a predetermined table (Step 1214). Next, an OK response 1215 for the NOTIFY message 1213 is sent to the call control server 105. The gateway 104*a* which receives the OK response 1210 sends a location registration acceptance message 1211 to the base station 101*a*. The base station 101*a* sends a location registration acceptance message 1212 to the mobile station 100*a*. In this way, location registration is completed.

2-2. Start Request

Figure 13A:
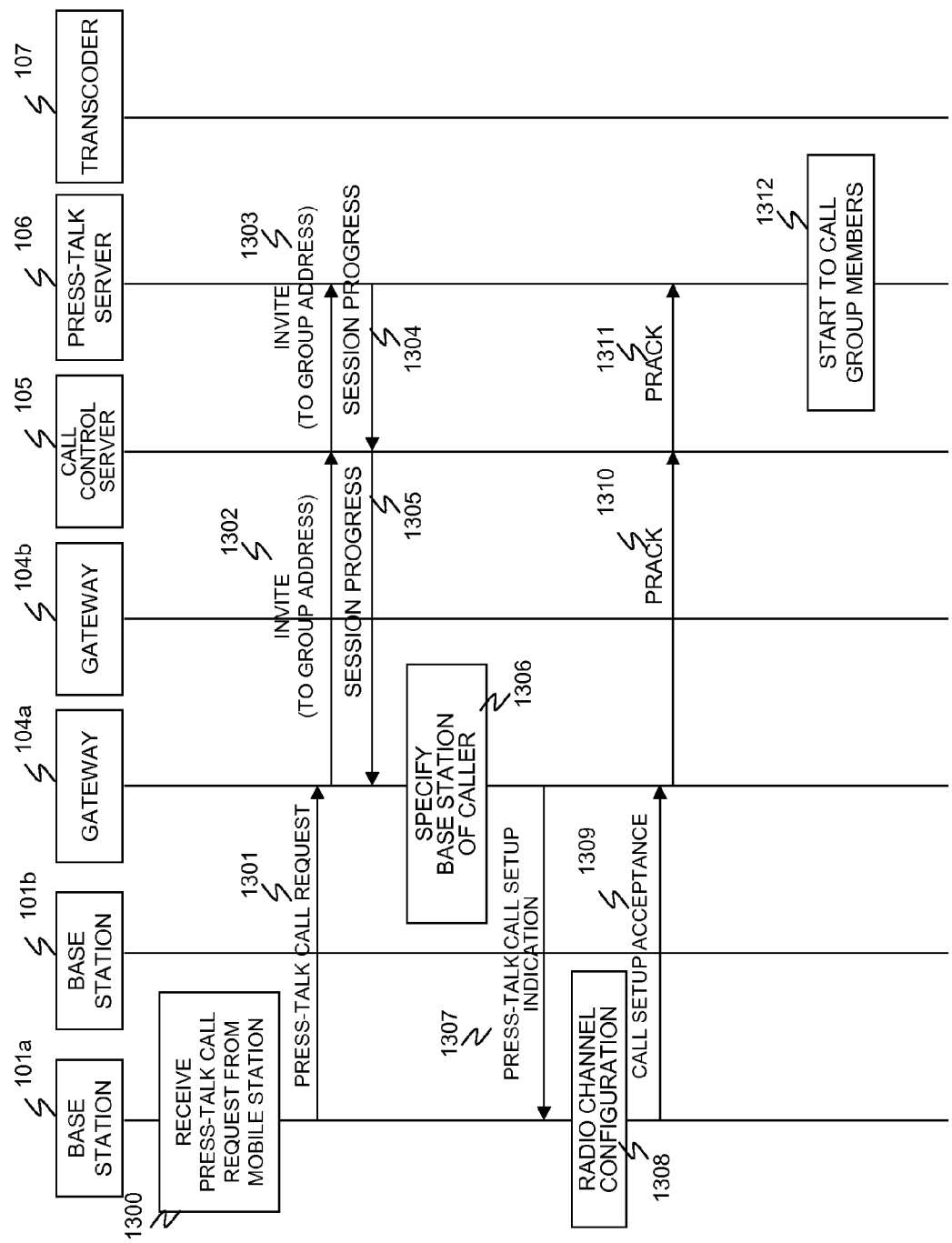
FIG. 13A is a sequence diagram of a first half of call control of a press-talk call.
Figure 13B:
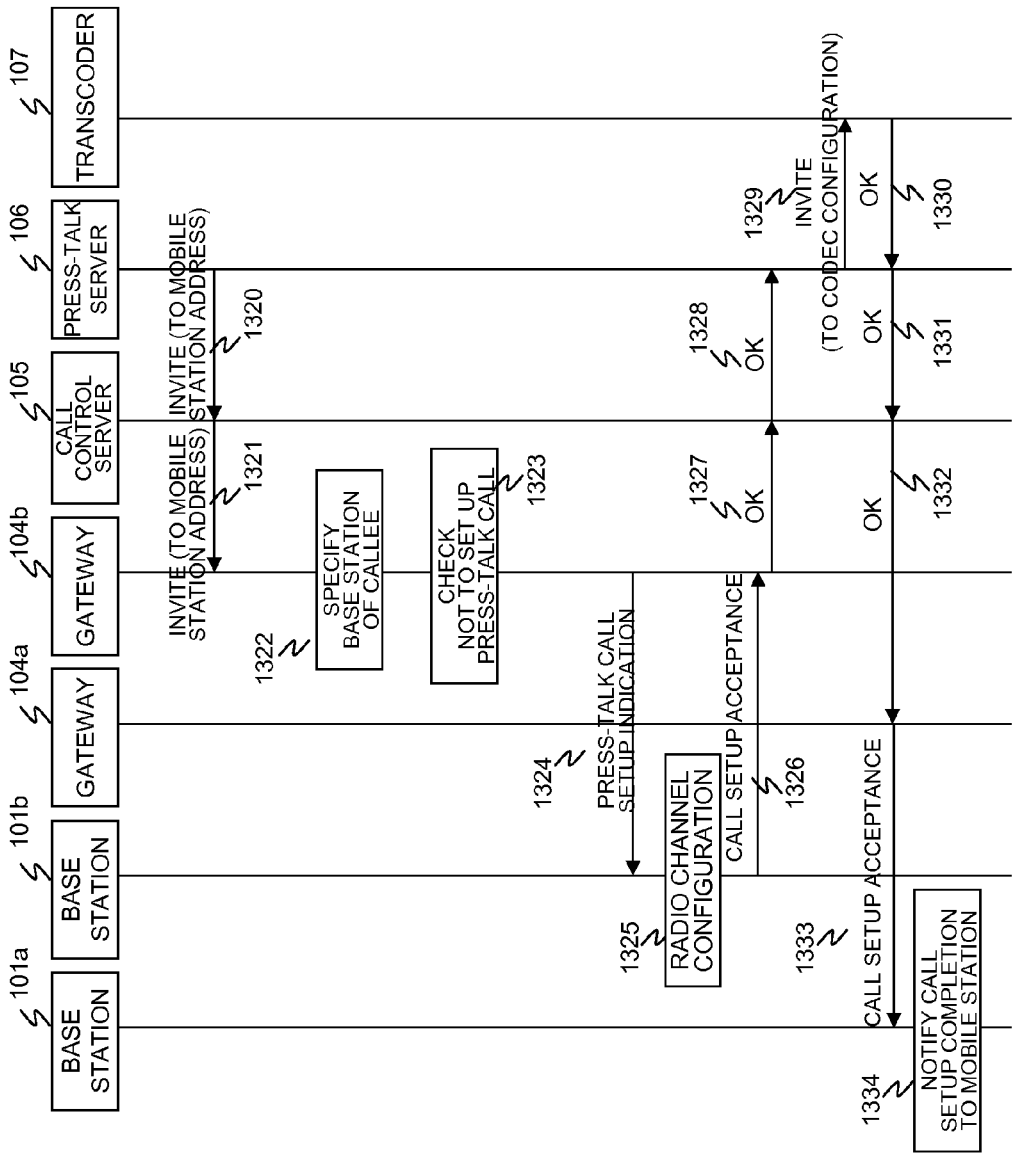
FIG. 13B is a sequence diagram of a second half of call control of a press-talk call.

FIGS. 13A and 13B are sequence diagrams of a first half and a second half when a mobile station starts a press-talk call, respectively.

First, when receiving a press-talk call request including a group number from the mobile station 100*a* (Step 1300), the base station 101*a* sends a press-talk call request message 1301 including the group number to the gateway 104*a*. The gateway 104*a* sets the group number to call in the press-talk call request message 1301 in an INVITE message 1302, creates an INVITE message including the following information, and sends the created INVITE message to the call control server 105.

Figure 17:
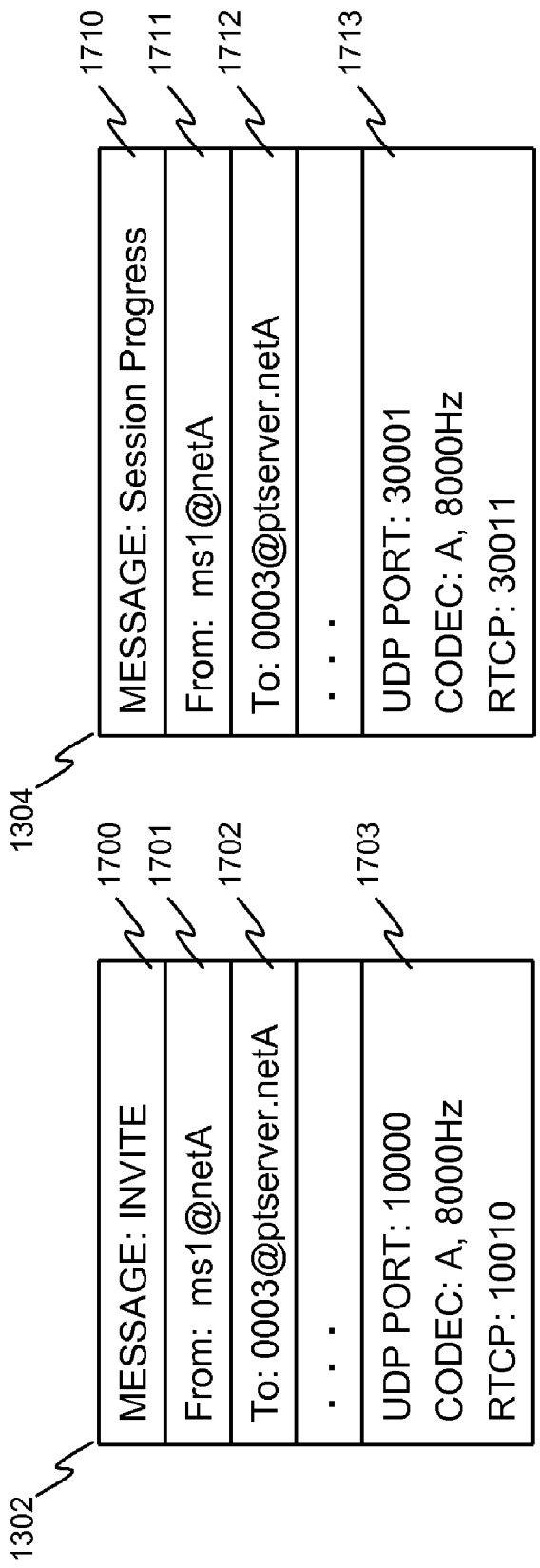
FIG. 17 is a diagram showing the formats of an outgoing message and a response message to be transmitted and received between a gateway and a press-talk server.

FIG. 17 shows the format of the INVITE message 1302. INVITE 1700 indicates a message type. From header 1701 sets the address of the caller. To header 1702 sets the destination address including a group address to call. In this case, "0003" is the number of the group called by the mobile station 100*a*, and "ptserver.netA" is the address of the press-talk server 106. Session information 1703 includes the codec type (in FIG. 17, codec A) of the mobile station 100*a*, the RTP clock rate (in FIG. 17, 8000 Hz), the UDP port (in FIG. 17, 10000) of the gateway 104*a*, which is used when a voice flow from/to the mobile station 100*a* is transmitted/received between the gateway 104*a* and the press-talk server 106, and the UDP port (in FIG. 17, 10010) of the gateway 104*a*, which is used when a talk burst control message (RTCP packet) is transmitted/received between the gateway 104*a* and the press-talk server 106. The codec type and the RTP clock rate are set with reference to the mobile station codec table (FIG. 11) created by the gateway 104*a* when the location of the mobile station 100*a* is registered. The UDP port is allocated with a number which is empty at that time.

Next, since the domain name of the To header 1702 in the INVITE message 1302 is "ptserver.netA", the call control server 105 routes the INVITE message to the press-talk server 106. The press-talk server 106 creates a Session Progress message 1304 including the following information and sends the created Session Progress message 1304 to the call control server 105.

FIG. 17 shows the format of the Session Progress message 1304. Session Progress 1710 is a message type. From header 1711 and To header 1712 are set to be identical to the INVITE message 1302. Session information 1713 includes the codec type (in FIG. 17, codec A) of the mobile station 100*a*, the RTP clock rate (in FIG. 17, 8000 Hz), the UDP port (in FIG. 17, 30001) of the press-talk server 106, which is used when a voice flow from/to the mobile station 100*a* is transmitted/received between the gateway 104*a* and the press-talk server 106, and the UDP port (in FIG. 17, 30011) of the press-talk server 106, which is used when a talk burst control message (RTCP packet) is transmitted/received between the gateway 104*a* and the press-talk server 106. The UDP port is allocated with a number which is empty at that time.

Next, the call control server 105 routes the Session Progress message to the gateway 104*a* as a source. If the gateway 104*a* receives the Session Progress message 1305, RTP session negotiation between the gateway 104*a* and the press-talk server 106 is completed for the voice flow of the codec A transmitted/received from/to the mobile station 100*a*.

The gateway 104*a* specifies the base station of the caller (Step 1306), and sends a press-talk call setup message 1307. The base station 101*a* sets a radio channel for the call (Step 1308). Next, the gateway 104*a* sends a call setup acceptance message 1309 for the press-talk call setup message 1307 to the gateway 104*a*. The gateway 104*a* sends a PRACK (Preacknowledgement) message 1310, which means reception of the Session Progress message 1305, to the call control server 105. The call control server 105 routes the PRACK message to the press-talk server 106. The press-talk server 106 starts to call the group members (Step 1312). In this case, it is assumed that the group members are the mobile station 100*b* (ms2@netA) and the mobile station 100*c* (ms3@netA).

A description will now be provided with reference to FIG. 13B. From the NOTIFY messages received when the locations of the mobile stations 100*b* and 100*c* are registered, the press-talk server 106 knows that the mobile stations 100*b* and 100*c* are under the gateway 104*b*. Therefore, the press-talk server 106 sets information for identifying the mobile stations 100*b* and 100*c* in an INVITE message 1320 to create the INVITE message 1320 including the following information, and sends the created INVITE message 1320 to the call control server 105.

FIG. 18 shows the format of the INVITE message 1320. INVITE 1800 is a message type. From header 1801 sets a group number of an object to call. To header 1802 sets the mobile station address of the mobile station 100*b*, which is one of the incoming mobile stations. Session information 1803*a*, 1803*b*, 1803*c*, and 1803*d* are individually set for all the codec types supported by the transcoder 107. The codec type and the RTP clock rate are set with reference to the codec table 208 shown in FIG. 3. The UDP port in each of the session information 1803*a*, 1803*b*, 1803*c*, and 1803*d* is the UDP port of the press-talk server 106 which is used when a voice flow from/to the mobile station 100*b* or 100*c* is transmitted/received between the gateway 104*a* and the press-talk server 106. The RTCP is the UDP port of the press-talk server 106 which is used when a talk burst control message is transmitted/received between the gateway 104*a* and the press-talk server 106. These ports are allocated with numbers which are empty at that time. Address list 1804 sets the addresses of all of the mobile stations to be called which are located at the same gateway as the mobile station set in the To header 1802.

Returning to FIG. 13B, the call control server 105 which receives the INVITE message 1320 knows that ms2@netA of the To header 1802 in the message is under the gateway 104*b*, and thus the call control server 105 sends an INVITE message 1321 to the gateway 104*b*. The gateway 104*b* specifies the base station 101*b* at which the mobile stations 100*b* and 100*c* are located (Step 1322). In Step 1323, since a press-talk call to the base station 101*b* is not set up yet, a press-talk call setup message 1324 is sent to the base station 101*b*. The base station 101*b* sets a radio channel (Step 1325), and sends a call setup acceptance message 1326 to the gateway 104*b*. The gateway 104*b* creates an OK response 1327 for the INVITE message 1321 and sends the created OK response 1327 to the call control server 105.

FIG. 18 shows the format of the OK response 1327. OK response 1810 is a message type. From header 1811 and To header 1812 are identical to the From header 1801 and the To header 1802 of the INVITE message 1320. Session information 1813*a* and 1813*b* are set for the codec types used by the mobile stations 100*b* and 100*c* from among the session information 1803*a*, 1803*b*, 1803*c*, and 1803*d* in the INVITE message 1320. Specifically, the gateway 104*b* has the records of the mobile station 100*b* (ms2@netA) and the mobile station 100*c* (ms3@netA) as the mobile station codec table of FIG. 11. With reference to the records, the session information 1813*a* for the codec A and the session information 1813*b* for the codec B are set. The UDP port in the session information indicates the UDP port of the gateway 104*b* used in the RTP flow of the corresponding codec. The RTCP indicates the UDP port of the gateway 104*a* which is used when a talk burst control message is transmitted/received between the gateway 104*a* and the press-talk server 106. These UDP ports are allocated with numbers which are empty at that time. Address list 1814 sets mobile stations classified by codec type.

Returning to FIG. 13B, when receiving the OK response 1327, the call control server 105 routes the OK response 1327 to the press-talk server 106 which is the source of the INVITE message 1320. If the press-talk server 106 receives an OK response 1328, with respect to the voice flow of the codec A transmitted from/received to the mobile station 100*c* and the voice flow of the codec B transmitted from/received to the mobile station 100*b*, RTP session negotiation between the gateway 104*b* and the press-talk server 106 is completed.

The press-talk server 106 recognizes that the number of codecs used in the press-talk call is 2, the codecs A and B, and sends an INVITE message 1329 for transcoding configuration to the transcoder 107.

Figure 19:
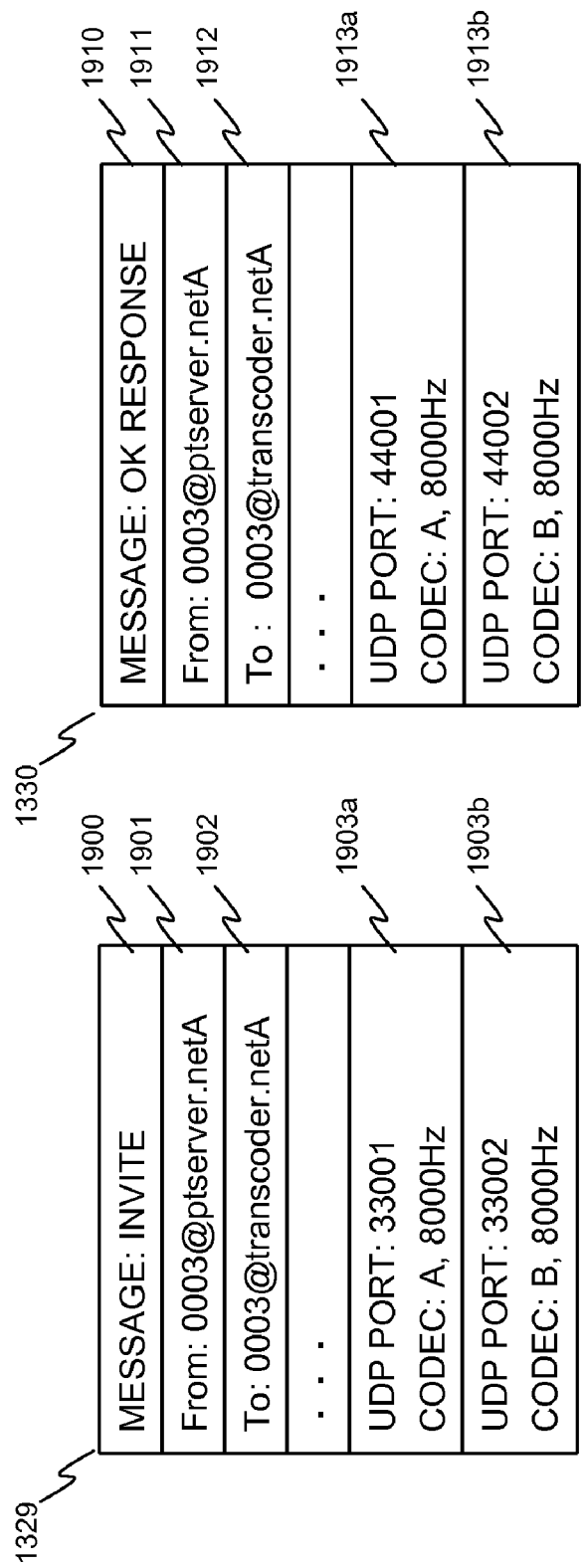
FIG. 19 is a diagram showing the format of a call control message to be transmitted and received between a press-talk server and a transcoder.

FIG. 19 shows the format of the INVITE message 1329. INVITE 1900 indicates a message type. From header 1901 sets the group number (in FIG. 19, 0003) and the address (in FIG. 19, ptserver.netA) of the press-talk server 106. To header sets the group number and the address (in FIG. 19, transcoder-.netA) of the transcoder. Session information 1903*a* and 1903*b* are individually set for the codec types used in the press-talk call. The codec type to be used in the press-talk call, the RTP clock rate, and the UDP port, which is used when the press-talk server 106 transmits/receives an RTP packet from/to the transcoder 107, are set.

Returning to FIG. 13B, the transcoder 107 sets the codec circuit and then sends an OK response 1330 to the press-talk server 106.

FIG. 19 shows the format of the OK response 1330. OK response 1910 is a message type. From header 1911 and To header 1912 are identical to the From header 1901 and To header 1902 of the INVITE message 1329. Session information 1913*a* and 1913*b* are individually set according to the session information 1903*a* and 1903*b* of the INVITE message 1329 (that is, for the codec types). The codec type to be used in the press-talk call, the RTP clock rate, and the UDP port, which is used when the transcoder 107 transmits/receives an RTP packet from/to the press-talk server 106, are set.

If the press-talk server 106 receives the OK response 1330, with respect to the voice flow of the codec A and the voice flow of the codec B, negotiation between the press-talk server 106 and the transcoder 107 is completed.

The press-talk server 106 sends an OK response 1331 for the INVITE message 1303 at the start of press-talk call setup to the call control server 105. The call control server 105 sends the OK response 1332 to the gateway 104*a*. The gateway 104*a* sends a call setup completion message 1333 for the press-talk call request message 1301 to the base station 101*a*. The base station 101*a* notifies call setup completion to the mobile station 100*a* (Step 1334). In this way, the press-talk call between the mobile station 100*a*, 100*b*, and 100*c* can be performed.

2-3. Release Request

Figure 14:
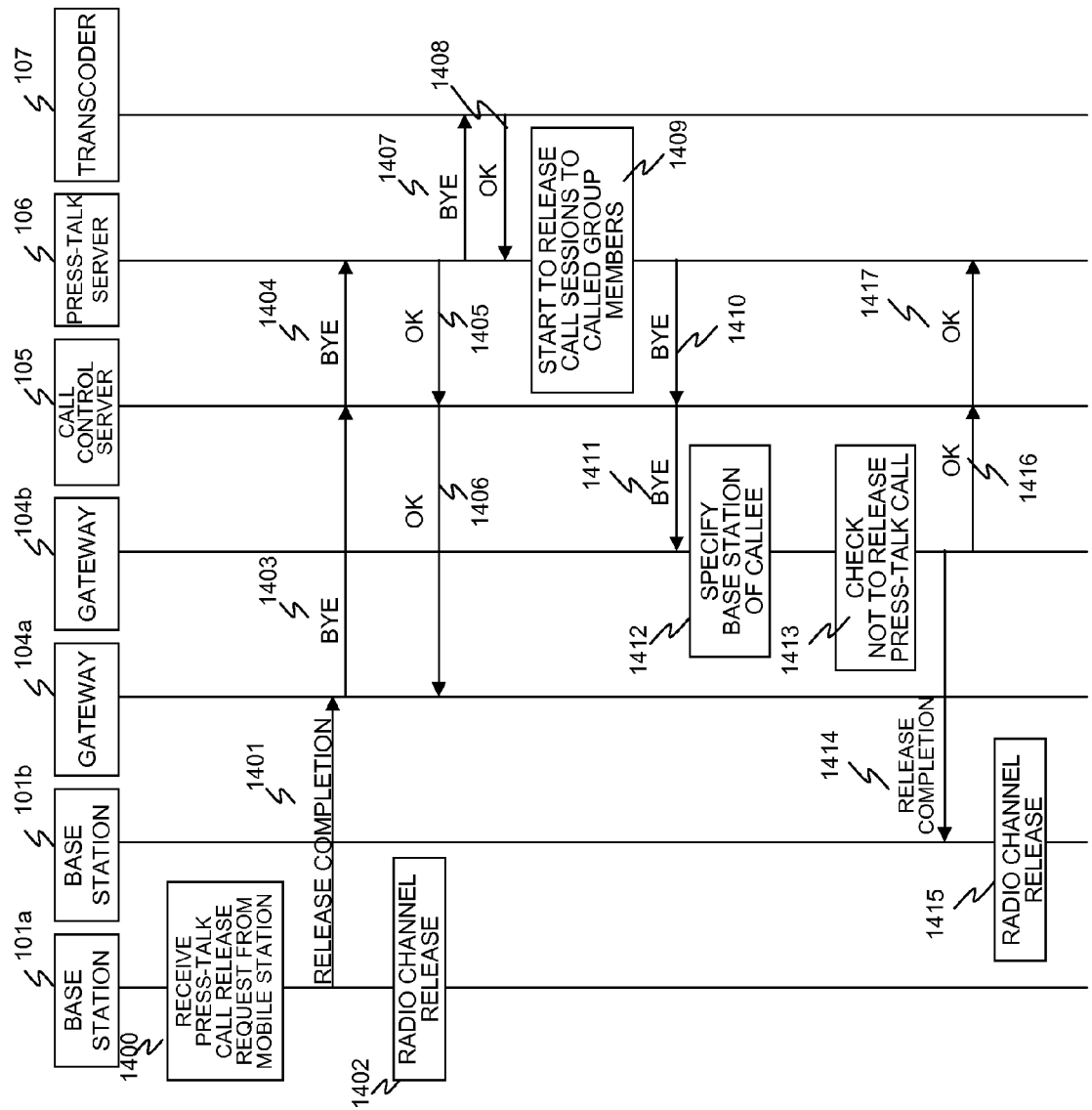
FIG. 14 is a sequence diagram of call release of a press-talk call.

FIG. 14 is a sequence diagram of press-talk call release.

Next, a sequence when a press-talk call is released will be described with reference to FIG. 14.

When receiving a press-talk call release request from the mobile station 100*a* which starts a press-talk call (Step 1400), the base station 101*a* sends a release completion message 1401 to the gateway 104*a*. The base station 101*a* also releases a radio channel (Step 1402). The gateway 104*a* which receives the release completion message 1401 sends a BYE message 1403 to the call control server 105. The call control server 105 sends a BYE message 1404 to the press-talk server 106. The press-talk server 106 sends an OK response 1405 for the BYE message 1404 to the call control server 105. The call control server 105 sends an OK response 1406 to the gateway 104*a*. The press-talk server 106 also sends a BYE message 1407 to the transcoder 107. The transcoder 107 releases a codec circuit, and sends an OK response 1408 to the press-talk server 106. The press-talk server 106 starts to release a call to the mobile stations 100*b* and 100*c* (Step 1409). The press-talk server 106 sends a BYE message 1410 to the call control server 105. The call control server 105 sends a BYE message 1411 to the gateway 104*b*. The gateway 104*b* specifies the base station 101*b* at which the mobile stations 100*b* and 100*c* are located (Step 1412), determines that press-talk call release is not performed with respect to the base station 101*b* (Step 1413), and sends a release completion message 1414 to the base station 101*b*. The base station 101*b* which receives the release completion message 1414 releases a radio channel (Step 1415). The gateway 104*b* also sends an OK response 1416 for the BYE message 1411 to the call control server 105. The call control server 105 routes the OK response to the press-talk server 106. In this way, the press-talk call is terminated.

2-4. Talk Burst Request

Figure 15:
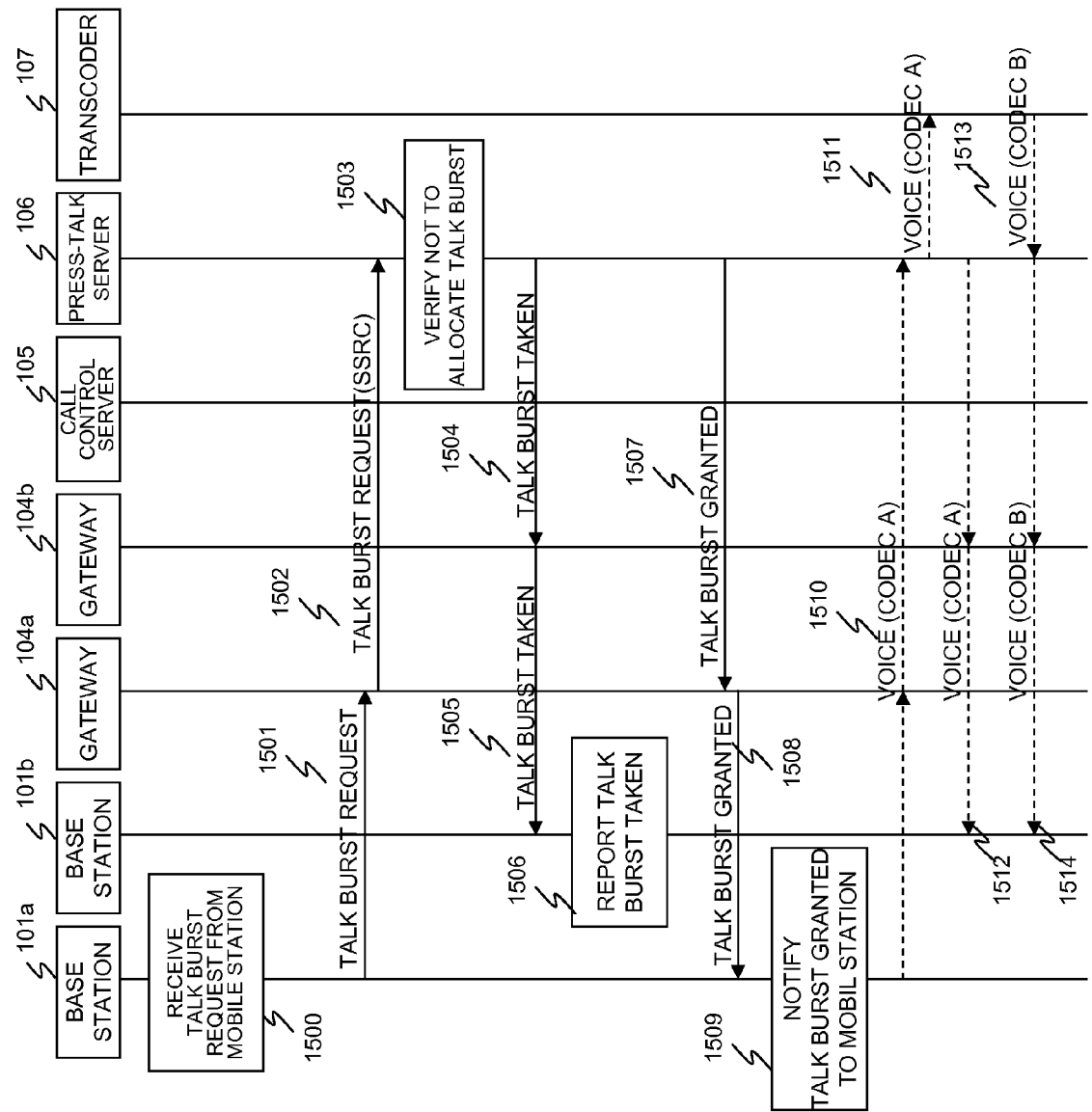
FIG. 15 is a sequence diagram of talk burst acquisition.

FIG. 15 is a sequence diagram showing a case where the mobile station 100*a* takes a talk burst and transmits voice information.

Next, a procedure for sending voice in a state where a press-talk call can be performed, that is, the sequences of FIGS. 13A and 13B are completed will be described with reference to FIG. 15. The following Talk Burst Request message, Talk Burst Taken message, Talk Burst Granted message, Talk Burst Release message, and Talk Burst Idle message have the same formats as the PoC standards, and are transmitted/received by RTCP packets. These packets and the RTP packet carrying voice information do not pass through the call control server 105.

The base station 101*a* receives a talk burst request from the mobile station (Step 1500). The base station 101*a* sends a talk burst request 1501 to the gateway 104*a*. The gateway 104*a* sends a Talk Burst Request message 1502 to the press-talk server 106. This message includes SSRC (Synchronization Source) defined by the RTP protocol as an identifier of a person who requests a talk burst. The SSRC may be selected by a random number or may be calculated by a mobile station address. In this embodiment, a mobile station address is not necessarily specified only by the SSRC, and the group members may use different SSRCs. The press-talk server 106 which receives the Talk Burst Request message 1502 verifies that no talk burst is granted to any one of the group members (Step 1503). The press-talk server 106 sends a Talk Burst Taken message 1504 to the gateway 104*b* in order to notify the mobile stations 100*b* and 100*c* that the talk burst is taken. The gateway 104*b* sends the notification to the base station 101*b* at which the mobile stations 100*b* and 100*c* are located. The base station 101*b* reports the mobile stations 100*b* and 100*c* that the talk burst is in use (Step 1506). The press-talk server 106 sends to a Talk Burst Granted message 1507 to the gateway 104*a*. The gateway 104*a* notifies permission for a talk burst of mobile station 100*a* to the base station 101*a*. The base station 101*a* notifies the mobile station 100*a* that the talk burst is granted (Step 1509). When this happens, the mobile station 100*a* sends voice information 1510 encoded by the codec A to the gateway 104*a* through the base station 101*a*. The gateway 104*a* sends the voice information 1510 to the press-talk server 106 by the UDP port for the codec A for which negotiation is established between the gateway 104*a* and the press-talk server 106 at the time of press-talk call setup. The press-talk server 106 sends the voice information 1510 received from the gateway 104*a* to the transcoder 107 in order to generate voice information encoded by the codec B.

Figure 27:
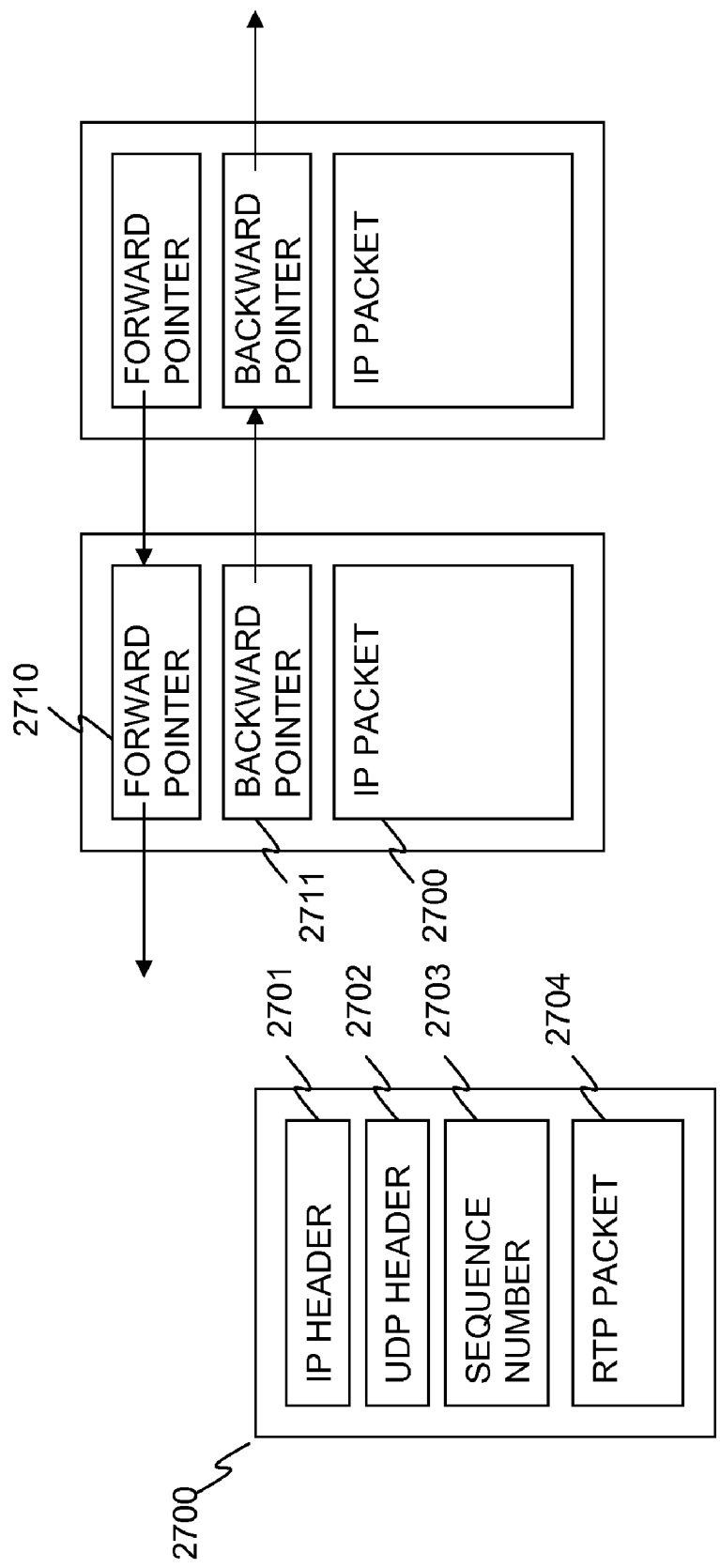
FIG. 27 is a diagram showing the format of a voice packet to be received by a transcoder from a press-talk server and the configuration of a queue in a jitter buffer.

FIG. 27 shows the format of an IP packet of the voice information 1511.

IP packet 2700 of the voice information 1511 includes IP header 2701, UDP header 2702, sequence number 2703, and RTP packet 2704. In the IP header 2701, the IP address of the press-talk server 106 as a source address, and the IP address of the transcoder 107 as a destination address are set. In the UDP header 2702 is set the number of a UDP port for the flow of the codec A for which negotiation is established between the press-talk server 106 and the transcoder 107 at the time of press-talk call setup. The sequence number 2703 is sequentially set to the IP packets 2700 of the voice information transmitted from the press-talk server 106 to the transcoder 107 during one press-talk call. The purpose of the sequence number 2703 will be described below. The RTP packet 2704 is an RTP packet received by the press-talk server 106 from the gateway 104*a*. The RTP packet includes the SSRC set in the Talk Burst Request message 1502 by the gateway 104*a*.

Returning to FIG. 15, the press-talk server 106 sends the voice information 1511 of the codec A to the transcoder 107, and also sends the same information to the gateway 104*b*. This is voice information for the mobile station 100*c* using the codec A and transmitted/received by the UDP port for the codec A. The gateway 104*b* sends received voice information 1512 of the codec A to the base station 101*b*. The base station 101*b* sends the voice information 1512 to the mobile station 100*c*. When receiving the voice information 1511 of the codec A, the transcoder 107 converts the voice information by the codec B, and returns voice information 1513 of the codec B to the press-talk server 106. At this time, an UDP port to be used is the UDP port for the flow of the codec B for which negotiation is established between the press-talk server 106 and the transcoder 107 at the time of press-talk call setup. The press-talk server 106 sends voice information 1514 of the codec B to the gateway 104*b*. This is voice information for the mobile station 100*b* using the codec B and is transmitted/received by the UDP port for the codec B. The gateway 104*b* sends the received voice information 1514 of the codec B to the base station 101*b*. The base station 101*b* sends the voice information to the mobile station 101*b*.

2-5. Release Request

Figure 16:
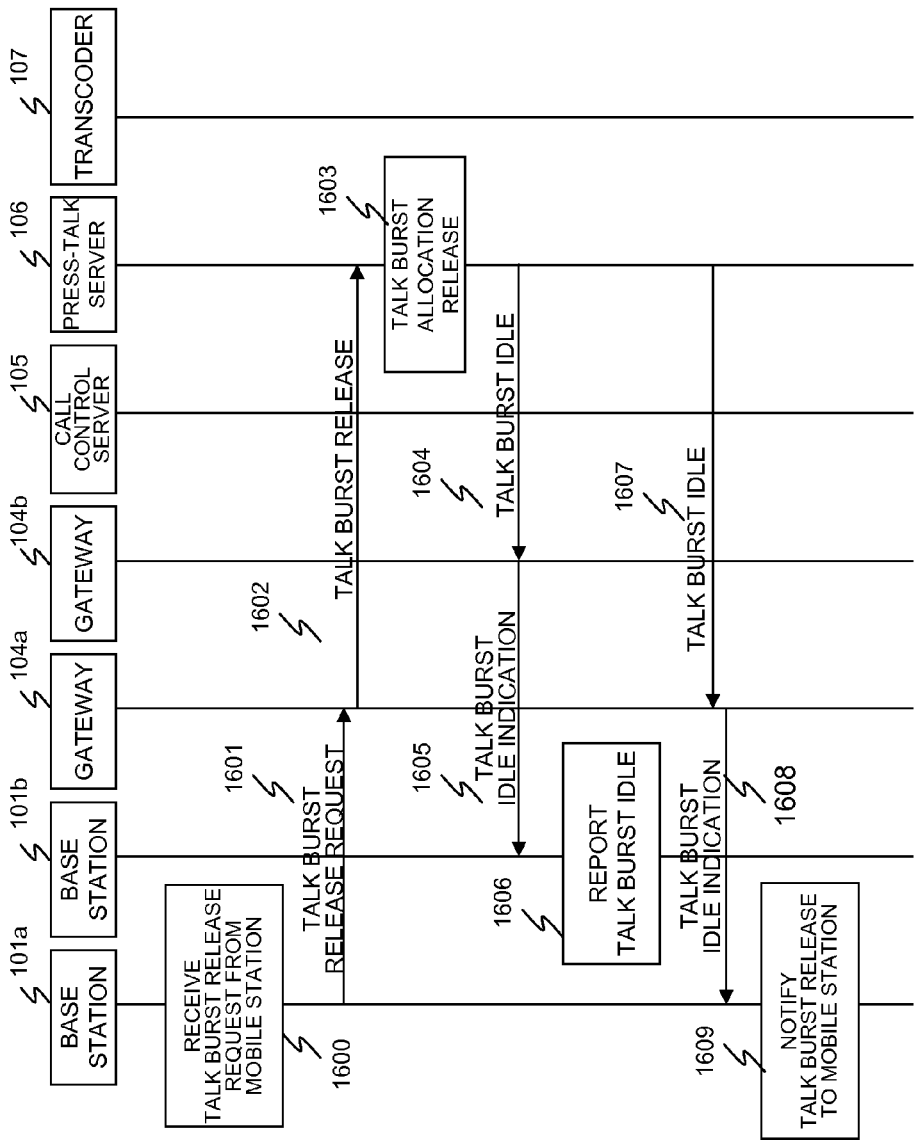
FIG. 16 is a sequence diagram of talk burst release.

FIG. 16 is a sequence diagram of talk burst release.

Next, a sequence when a mobile station which transmits voice information release a talk burst will be described with reference to FIG. 16. In FIG. 16, the mobile station 100a releases a talk burst. The base station 101a receives a talk burst release request from the mobile station 100a (Step 1600). The base station 101a notifies the gateway 104a that a talk burst was completed. The gateway 104a sends a Talk Burst Release message 1602 to the press-talk server 106. The press-talk server 106 revokes permission for the mobile station 100a to send a talk burst (Step 1603), and sends a Talk Burst Idle message 1604 to the gateway 104b. The gateway 104b notifies the base station 101b that no mobile station gets permission for a talk burst, and the base station 101b reports it to the mobile stations 100b and 100c (Step 1606). The press-talk server 106 also sends a Talk Burst Idle message 1607 to the gateway 104a. The gateway 104a notifies the base station 101a that no mobile station gets permission for a talk burst, and the base station 101a notifies it to the mobile station 100a (Step 1609).

3. Detailed Flowchart 3-1. Talk Burst Request

Next, the details of a procedure will be described with reference to flowcharts and tables.

First, how a voice packet from the mobile station 100a which takes a talk burst is transferred and transcoded after press-talk call setup is completed will be described.

(1) Press-talk Server

Figure 23:
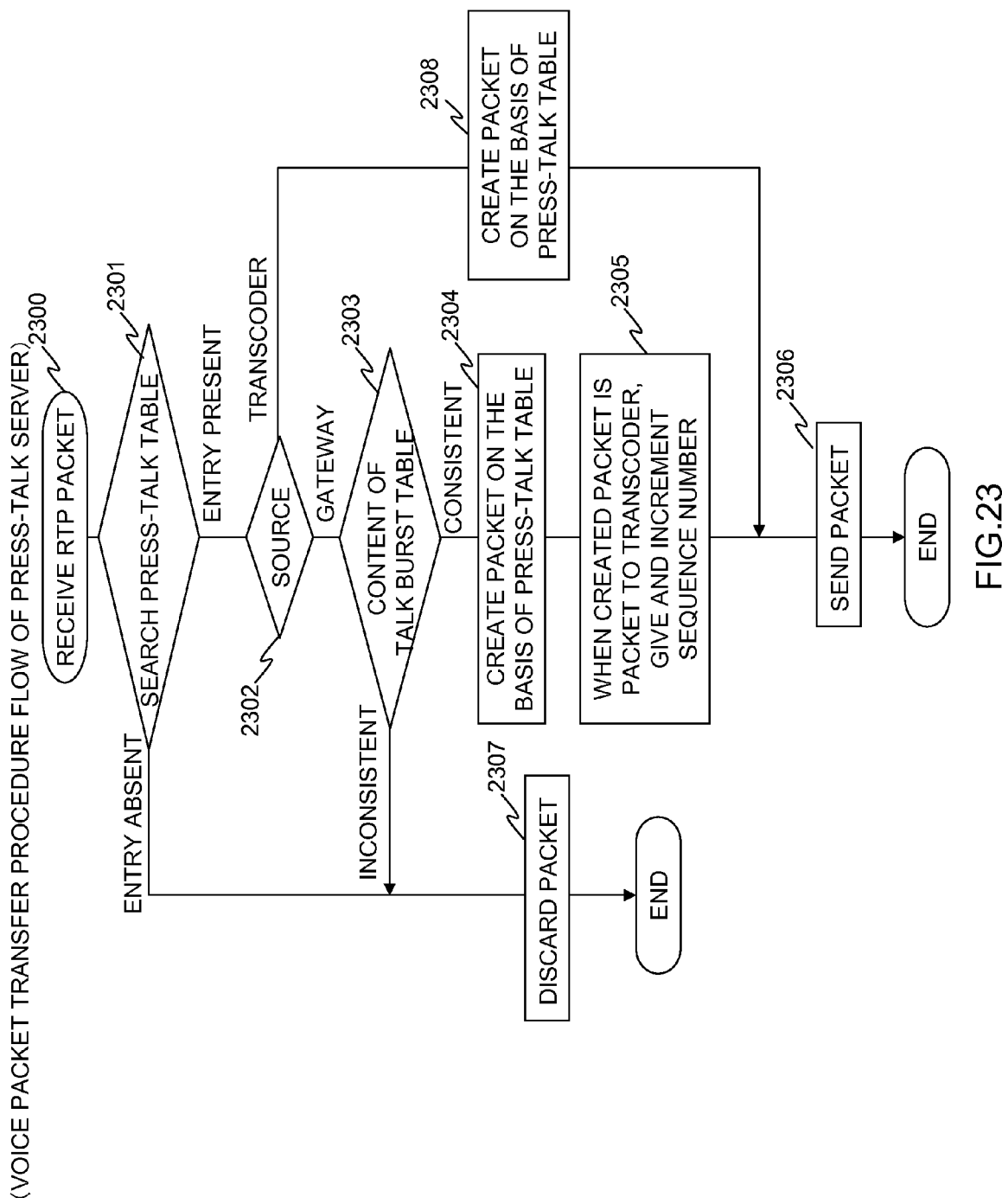
FIG. 23 is a diagram showing a voice packet transfer procedure flow of a press-talk server.

FIG. 23 is a flowchart showing a case the press-talk server 106 receives RTP packets from the gateways 104a and 104b and the transcoder 107. In the sequence of FIG. 15, a case where the voice information 1510 of the codec A is received from the gateway 104a, or the voice information 1513 of the codec B is received from the transcoder 107 is selected.

First, a case where an RTP packet is received from the gateway 104a will be described.

Referring to FIG. 23, when receiving an RTP packet, in Step 2301, the press-talk server 106 searches the press-talk table 211 shown in FIG. 5.

With respect to the press-talk table 211 of FIG. 5, in Step 2301, it is checked whether or not a group identical to the socket of the received RTP packet exists in the received packet information 502. For all the call groups 500, if no received packet information 502 identical to the received RTP packet exists, the received packet is discarded as an unauthorized packet (Step 2307), and the process ends.

Returning to Step 2301, when the received packet is an RTP packet which carries voice information transmitted from the mobile station 100a, the received packet is identical to information of the first row in the press-talk table 211 of FIG. 5. Thus, the process progresses to Step 2302. In Step 2302, it is determined whether the source IP address 501 is the IP address of the gateway 104a or 104b or the IP address of the transcoder 107. Since the received packet is a packet from the gateway 104a, that is, the gateway a, the process progresses to Step 2303. In Step 2303, for a predetermined call group registered in the talk burst table 210 of FIG. 4, it is determined whether or not the received packet is identical to information regarding a mobile station which takes a talk burst.

With respect to the talk burst table 210 of FIG. 4, when socket information of the received packet and the SSRC are identical with the entries of the talk burst table 210, the received packet is a packet that is to be delivered to other group members. Therefore, the process progresses to Step 2304, and a transmission packet is created. In Step 2303, when the received packet is not identical to the content of the talk burst table 210, the packet is discarded (Step 2307).

In Step 2304, the IP header and the UDP header of the transmission packet are generated by the transmission packet information 509 of the press-talk table 211. The transmission packet information 509 which corresponds to the received packet information 502 of the received RTP packet is socket information of the transmission packet to be generated. Since the received packet information 502 of the received RTP packet corresponds to the first row, when the packet is transmitted, socket information is of two types, (source IP address, source UDP port, destination IP address, destination UDP port)=(press-talk server, 30001, gateway b, 40001) and (press-talk server, 33001, transcoder, 44001). That is, the received RTP packet is copied and packets to be transmitted to the gateway 104b and the transcoder 107 are generated. Next, in Step 2305, when the generated transmission packet is to be transmitted to the transcoder 107, the sequence number 521 stored in the sequence number table 212 (see FIG. 5) is inserted between the UDP header and the RTP packet, and the sequence number 521 of the sequence number table 212 increments. The completed packet to be transmitted to the transcoder has the same format as the IP packet 2700 of FIG. 27.

The completed packet in Step 2305 of FIG. 23 is sent to the outside in Step 2306. This is a procedure in the sequence of FIG. 15 from when the voice information 1510 is received until the voice information 1511 and 1512 are transmitted.

Next, a case where an RTP packet is received from a transcoder will be described with reference to FIG. 23. In the sequence of FIG. 15, a case where the voice information 1513 of the codec B is received is selected.

In Step 2301 of FIG. 23, it is assumed that the socket information of the received RTP packet is identical to the received packet information 502 of a last row in the press-talk table 211. In Step 2302, since the source IP address 501 of the received RTP packet is a transcoder, in Step 2308, a packet is created. A creation procedure is the same as Step 2304, and the transmission packet information 509 which corresponds to the received packet information 502 is socket information of a transmission packet to be generated. That is, a packet of (source IP address, source UDP port, destination IP address, destination UDP port)=(press-talk server, 30002, gateway b, 40002) is created. Next, the packet is transmitted (Step 2306).

Although the codec 506 and the number of MSs 507 in the press-talk table 211 are not used, these are used when the press-talk table 211 is configured at the time of press-talk call setup. The details will be described below.

(2) Transcoder

Next, a procedure for processing voice information in the transcoder 107 will be described. This procedure corresponds to a procedure in the sequence of FIG. 15 from when the voice information 1511 of the codec A is received from the press-talk server 106 until the voice information 1513 of the codec B is transmitted. The IP packet of the voice information 1511 has the same format as the IP packet 2700 in FIG. 27.

Figure 24:
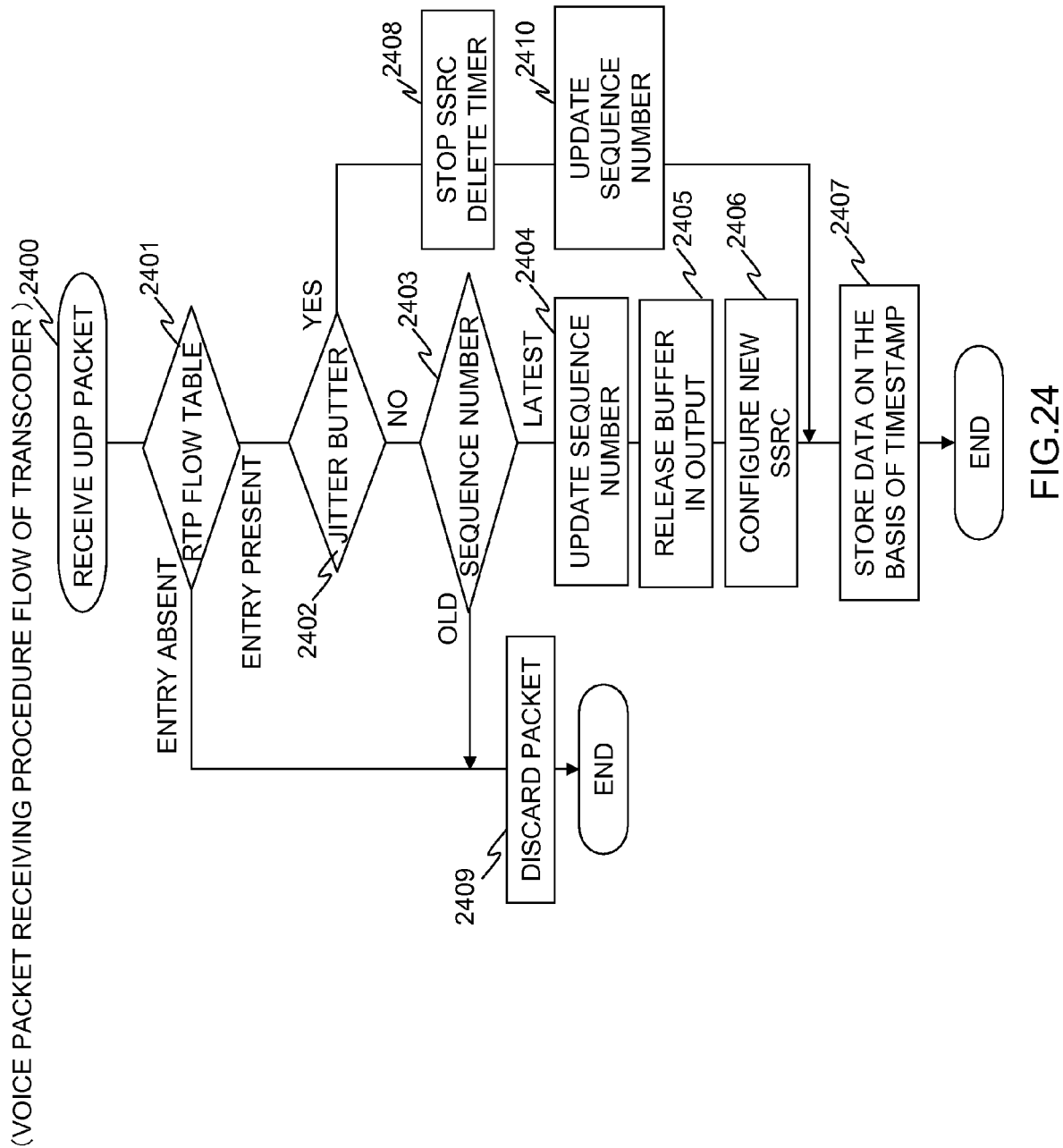
FIG. 24 is a diagram showing a voice packet receiving procedure flow of a transcoder.

FIG. 24 is a flowchart showing a case where the transcoder 107 receives the voice information 1511 from the press-talk server 106. First, if a UDP packet is received from the outside, in Step 2401, the RTP flow table 707 in FIG. 9 is searched.

The socket information of the RTP packet of the codec A received from the press-talk server 106 is (source IP address, source UDP port, destination IP address, destination UDP port)=(press-talk server, 33001, transcoder, 44001), as described above. That is, the socket information of the received RTP packet is identical to the first row of the call group 900 of the RTP flow table 707 in FIG. 9. Therefore, the process progresses to Step 2402 of FIG. 24. If the socket information of the received RTP packet is not identical to all the call groups 900, the packet is discarded (Step 2409), and the process ends.

In Step 2402, based on the call group, the press-talk server UDP port and the SSRC, it is determined whether or not a buffer corresponding to the received RTP packet exists in the RTP jitter buffer 709 shown in FIG. 10.

The UDP number of the press-talk server of the received RTP packet is 33001, and thus the first row of the RTP jitter buffer 709 is focused. At this time, the SSRC 1003 indicates the SSRC of a mobile station which is expected to have a talk burst.

When the received RTP packet is an initial RTP packet after press-talk call setup, the SSRC 1003 is NULL. In this case, in Step 2402, it is determined as "No". When the received RTP packet is an initial RTP packet after another mobile station takes a talk burst, the SSRC 1003 is not NULL, and not identical to the SSRC of the received RTP packet. In this case, in Step 2402, it is also determined as "No". If it is determined as "No", in Step 2403, the received sequence number 1002 and the sequence number 2703 of the received packet are checked. First, when the received sequence number 1002 is NULL, the received RTP packet is an initial RTP packet after press-talk call setup. Therefore, the process progresses to Step 2404, and the buffer is to be updated by the received packet. When the received sequence number 1002 is not NULL, the received sequence number 1002 and the sequence number 2703 of the received packet are compared with each other. When the sequence number 2703 of the received packet is more up-to-date, the received packet is an initial RTP packet after the mobile station which takes the talk burst is switched. Therefore, the process progresses to Step 2404, and the buffer is to be updated by the received packet. When the received sequence number 1002 is more up-to-date than the sequence number 2703 of the received packet, it is determined that, after the mobile station which takes the talk burst is switched, an old RTP packet before switching reaches. In Step 2409, the packet is discarded.

In Step 2404, the sequence number 2703 of the received packet is copied to the received sequence number 1002. In Step 2405, when the head pointer 1006 is not NULL, old RTP packets before the mobile station which takes the talk burst configures a queue, the old packets are all released (discarded). The head pointer 1006 stores the memory address of the backward pointer 2711 added to the UDP packet of voice information which is to be next input to the decoder (see FIG. 27). The backward pointer 2711 stores the memory address of the backward pointer added to the UDP packet of voice information which is to be subsequently input to the decoder. With this repetition, the RTP packets having the same SSRC configure a queue in an input sequence to the decoder, and the backward pointer added to the last packet is set to NULL. Therefore, in order to release the packets, it is preferably to sequentially pull out the packets from the head pointer 1006 and release the memory until the backward pointer 2711 becomes NULL. If release is completed, the head pointer is initialized to NULL.

In Step 2406, the SSRC of the received RTP packet is copied to the SSRC 1003. The next input time 1004 and the next input timestamp are initialized to NULL.

In Step 2407, a packet is inserted into a queue from the head pointer 1006 on the basis of the timestamp in the received RTP packet. When the next input timestamp 1005 is NULL, the received packet is an initial packet received from the mobile station which takes the talk burst, and the received packet is set in the head of the queue. That is, the address of the backward pointer 2711 added to the IP packet 2700 is set in the head pointer 1006. The forward pointer 2710 and the backward pointer 2711 are set to NULL. The address of the forward pointer 2710 is set in the tail pointer 1007. The value of the timestamp in the received RTP packet is set in the next input timestamp 1005. A time at which the voice information of the received RTP packet is input to the decoder is set in the next input time 1004. For example, a value obtained by adding a jitter amount when the packet reaches to the current time is used.

In Step 2402, if it is determined on the basis of the RTP jitter buffer 709 that, in the buffer in which the call group 1000 and the press-talk server UDP port 1001 are identical to those of the received IP packet, the SSRC 1003 is identical to the SSRC of the received RTP packet, in Step 2408, an SSRC delete timer is stopped. The SSRC delete timer is a timer that starts when no voice information to be input to the decoder exists, without receiving all the RTP packets from the press-talk server 106. When the SSRC delete timer is time out, the SSRC 1003, the next input time 1004, and the next input timestamp 1005 are initialized to NULL.

The process progresses to Step 2410, and the sequence number 2703 of the received packet and the received sequence number 1002 are compared with each other. When the sequence number 2703 is larger, the value is set in the received sequence number 1002.

The process progresses to Step 2407, and the received packet is input into the input wait queue to the decoder. First, the next input timestamp 1005 is compared with the timestamp in the received RTP packet. If the timestamp in the received RTP packet is smaller, the received packet is set in the head of the queue, and the timestamp in the received RTP packet is copied to the next input timestamp 1005. If the timestamp in the received RTP packet is larger, it is compared with the timestamp of the head RTP packet along the head pointer 1006. If the timestamp in the received RTP packet is smaller, the received packet is set in the head of the queue. If the timestamp of the received RTP packet is larger, it is compared with the timestamp of the second packet, and if the timestamp of the received RTP packet is smaller, the received RTP packet is inserted before the second packet. As such, the received RTP packet is inserted from the head of the queue so as to be arranged in an ascending order of the timestamp. When the received packet is inserted in the tail of the queue, the tail pointer 1007 is updated.

Figure 25:
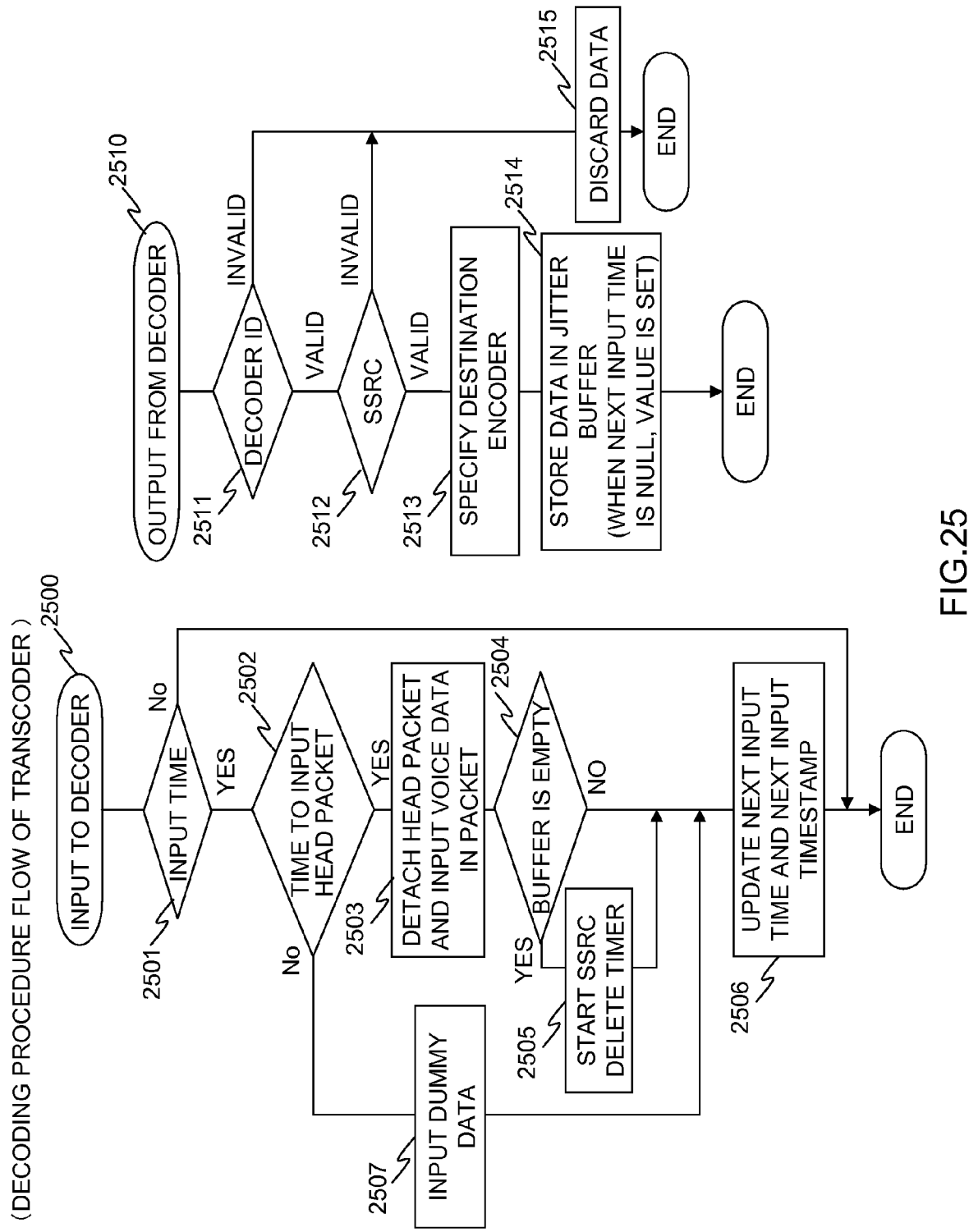
FIG. 25 is a diagram showing a decoding procedure flow of a transcoder.

FIG. 25 is a diagram showing a decoding procedure flow of a transcoder.

Next, a procedure for inputting voice information from the RTP jitter buffer 709 to the decoder will be described with reference to FIG. 25. This procedure is also executed by the transcode control module 702. A decoder input procedure 2500 starts periodically. First, the next input time 1004 of the RTP jitter buffer 709 is compared with the current time (Step 2501). When the current time does not reach the next input time 1004, or the next input time 1004 is NULL, the process ends. When the current time exceeds the next input time 1004, the timestamp of the head packet is compared with the next input timestamp 1005 with reference to the head pointer 1006 (Step 2502). If the timestamp of the head packet is larger, the current time does not reach the input time of the head packet, and thus, instead of the RTP packet to be originally input, dummy data is input to the decoder (Step 2507). This occurs when a packet is lost between the press-talk server 106 and the transcoder 107.

In Step 2502, if the timestamp of the head packet is equal to or smaller than the next input timestamp 1005, the head packet is detached from the queue, and voice information is input to the decoder (Step 2503). The decoder as a destination is decided by using the transcode table 708 shown in FIG. 9.

In the transcode table 708 of FIG. 9, as the first row of the table is viewed, it can be seen that the RTP flow of the corresponding call group with the press-talk server UDP port 911 set to 33001 (the flow of the codec A from the RTP flow table 707) is decoded by the decoder A001 using the codec A, and encoded by the encoder B103 using the codec B, and sent to the press-talk server 106 as an RTP flow with the transcoder UDP port 914 set to 44002 (the flow of the codec B from the RTP flow table 707).

The process progresses to Step 2504 of FIG. 25, and it is determined whether or not the buffer is empty, that is, no packet to be input to the decoder exists. When no packet exists, the SSRC delete timer starts (Step 2505). In Step 2506, the next input time 1004 and the next input timestamp 1005 are updated. The next input time 1004 is updated to a value obtained by adding a time (in FIG. 8, 40 ms) per frame with reference to the frame rate 808 corresponding to the codec type 800 of the codec resource management table 705 shown in FIG. 8. The next input timestamp 1005 is updated to a value obtained by adding the number of clocks (in FIG. 8, 8000× 0.04 s=320) per frame with reference to the RTP clock rate 801 corresponding to the codec type 800 of the codec resource management table 705.

Next, a procedure for queuing PCM voice information output from a decoder in the decoded data jitter buffer 710 will be described. In a decoder output procedure 2510 of FIG. 25, if the transcode control module 702 detects the output from the decoder, the decoder ID 912 of the transcode table 708 is searched (Step 2511). If no decoder ID as an output source is found, output data is discarded (Step 2515). If a decoder ID is found, the process progresses to Step 2512. In Step 2512, the press-talk server UDP port 911 corresponding to the decoder ID 912 is obtained, and the SSRC 1003 is referred to the press-talk server UDP port 1001 of the RTP jitter buffer 1000. When the SSRC 1003 is NULL, it is determined that the output from the decoder is not necessary, and the output is discarded (Step 2515). When the SSRC 1003 is not NULL, in Step 2513, the encoder ID 913 corresponding to the decoder ID 912 of the transcode table 708 is obtained, which specifies an encoder to be input the PCM voice information. In Step 2514, the PCM voice information is queued into the input wait queue corresponding to the encoder ID 1010 of the decoded data jitter buffer 710 (see FIG. 10).

In case of voice information initially received by the mobile station which takes the talk burst, since the next input time 1011 is NULL, it is set to a value obtained by adding a to the current time. α is, for example, a value based on an output jitter of the PCM voice information from the decoder.

Figure 26:
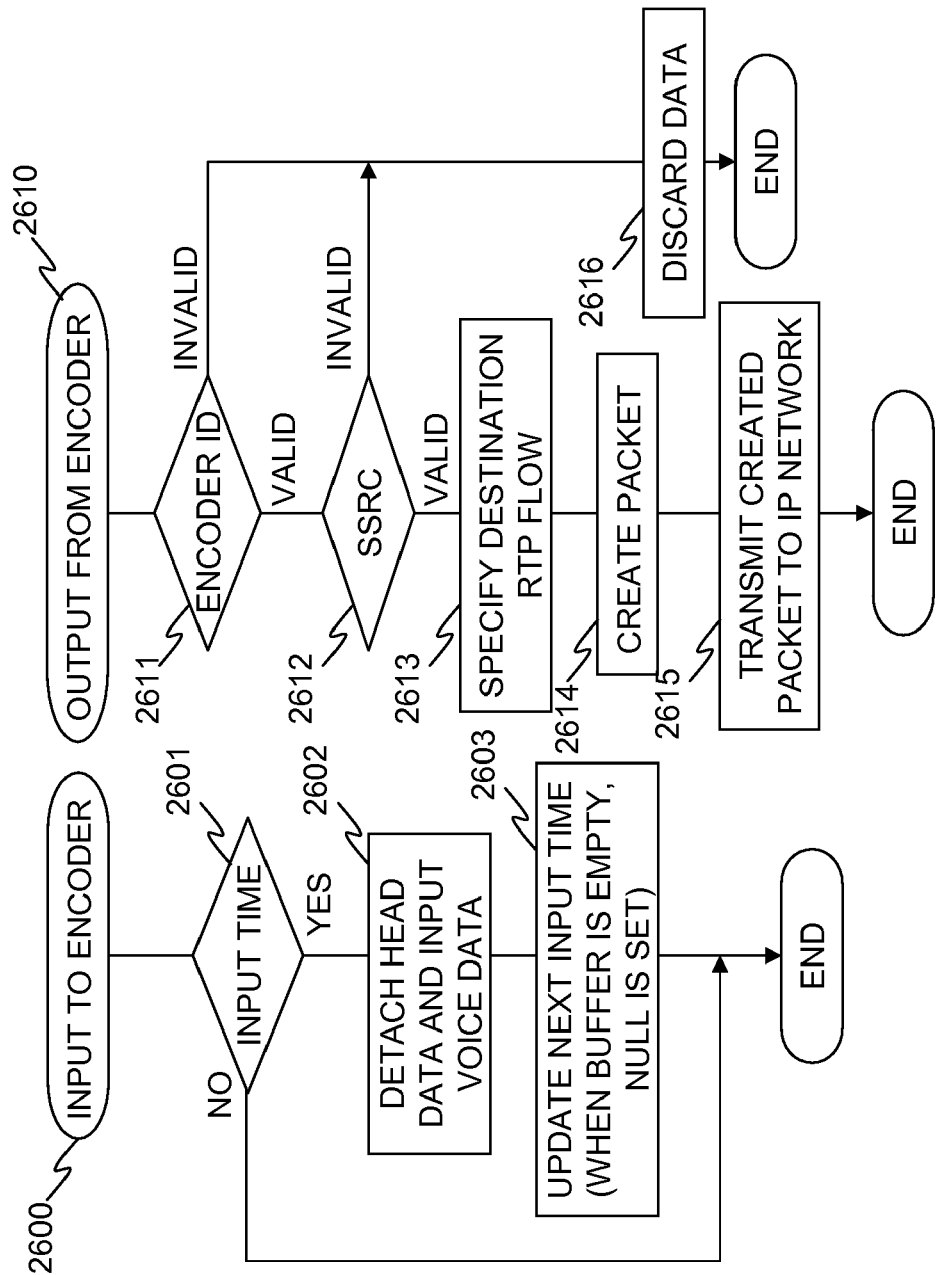
FIG. 26 is a diagram showing an encoding procedure flow of a transcoder.

FIG. 26 is a diagram showing an encoding procedure flow of a transcoder.

Next, a procedure for inputting voice information from the decoded data jitter buffer 710 to the encoder will be described with reference to FIG. 26. This procedure is also executed by the transcode control module 702. An encoder input procedure 2600 starts periodically. First, the next input time 1011 of the decoded data jitter buffer 710 is compared with the current time. When the current time does not reach the next input time 1011, or the next input time 1011 is NULL, the process ends (Step 2601). When the current time exceeds the next input time 1011, the head PCM voice information is detached from the queue with reference to the head pointer 1012, and input to an encoder identified by the encoder ID 1010 (Step 2602). In Step 2603, the next input time 1011 is updated. The next input time 1011 is set to a value obtained by adding the current time and a reciprocal (that is, a time per clock) of the RTP clock rate 801 corresponding to the codec type 800 in the codec resource management table 705 of FIG. 8. The encoder may independently decrease an input frequency. In this case, an addition value may be stored by a specific parameter regardless of the RTP clock rate 801. When no voice information to be input to the encoder exists, the next input time 1011 is set to NULL.

Next, a procedure for sending voice information output from the encoder to the press-talk server 106 will be described. In an encoder output procedure 2610 of FIG. 26, if the transcode control module 702 detects the output of the encoder, the encoder ID 913 of the transcode table 708 is searched (Step 2611). If no encoder ID as an output source is found, output data is discarded (Step 2616). If an encoder ID is found, the process progresses to Step 2612. In Step 2612, the press-talk server UDP port 911 corresponding to the encoder ID 913 is obtained, and the SSRC 1003 is obtained by the press-talk server UDP port 1001 in the RTP jitter buffer 1000. When the SSRC 1003 is NULL, it is determined that the output from the encoder is not necessary, and the output is discarded (Step 2616). When the SSRC 1003 is not NULL, in Step 2613, the transcoder UDP port 914 corresponding to the encoder ID 913 of the transcode table 708 is obtained, and an RTP flow to send an encoding result is specified with reference to the UDP port 903 of the RTP flow table 707. In Step 2614, an RTP/UDP/IP packet is created, and in Step 2615, the created RTP/UDP/IP packet is sent to the IP network.

Hitherto, how the voice packet from the mobile station 100*a* which takes the talk burst is transferred and transcoded after press-talk call setup has been described.

3-2. Start Request

Next, in a signaling procedure for press-talk call setup and talk burst acquisition, a procedure for initializing the tables in processing a voice packet will be described with reference to the flowcharts.

(1) Press-Talk Server

Figure 20:
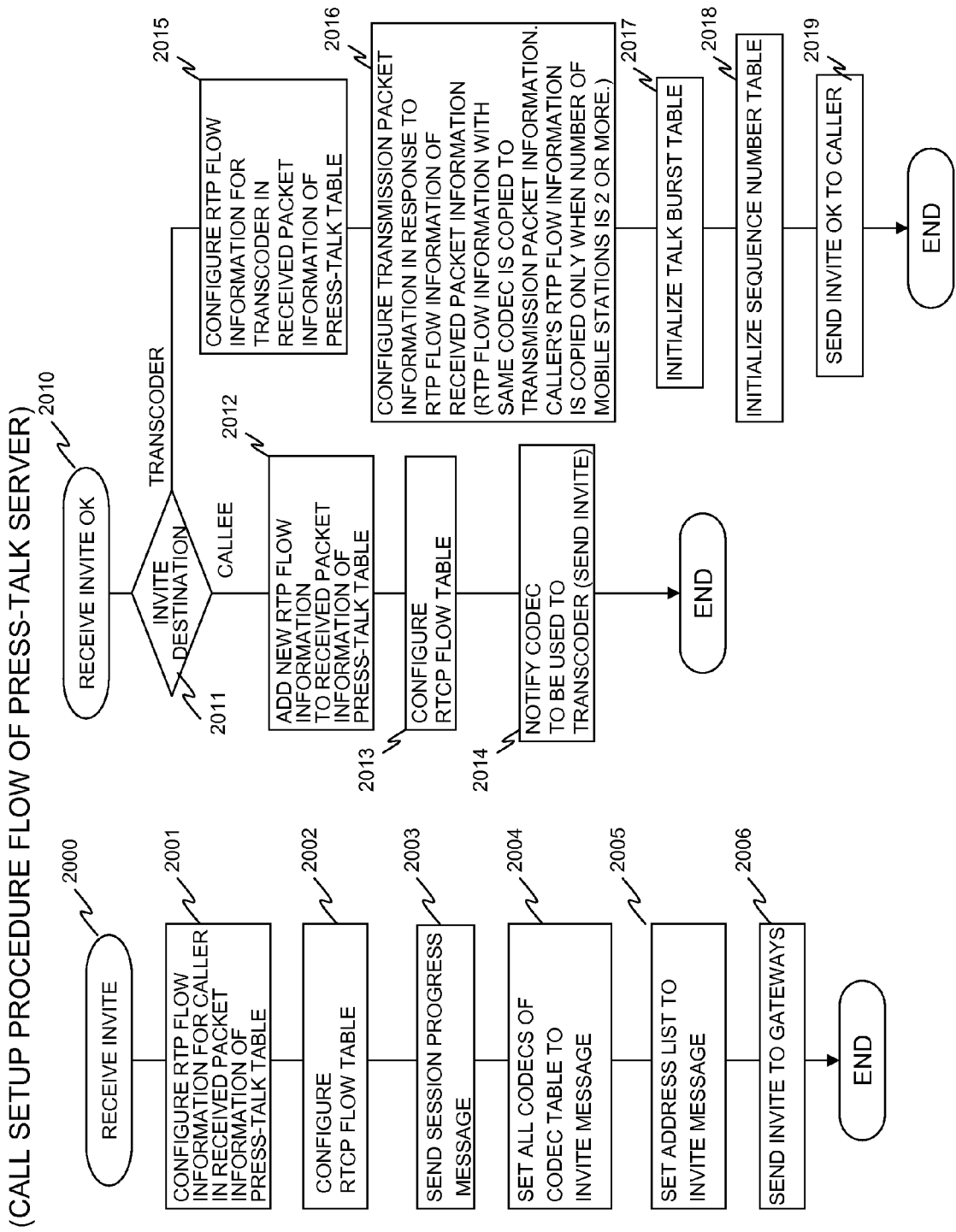
FIG. 20 is a diagram showing a call setup procedure flow of a press-talk server.

FIG. 20 is a flowchart of the press-talk control module 205 when the press-talk server 106 accepts a press-talk call from the call control server 105. An INVITE receiving procedure 2000 is performed when the press-talk server 106 receives the INVITE message 1303 in the sequence of FIG. 13A.

In Step 2001, RTP flow information for a caller is set in the received packet information 502 of the press-talk table 211 in FIG. 5 on the basis of the content of the message in FIG. 17. First, the content of the To header 1702 in the INVITE message 1302 is copied to the call group 500. The IP address of the address (ms1@netA) indicated by the From header 1701 in the INVITE message 1302 is set in the source IP address 501. Since ms1@netA is a virtual SIP terminal on the gateway 104*a*, the address of the gateway 104*a* is set in the source IP address 501. Note that the press-talk server has found the address of the gateway 104*a* as that of ms1@netA in Step 1214 during location registration of the mobile station 100*a*. The UDP port "10000" of the session information 1703 is set in the source UDP port 503. The IP address of the press-talk server 106 is set in the destination IP address 504. An unused UDP port number of the press-talk server 106 is set in the destination UDP port 505. The codec "A" of the session information 1703 is set in the codec 506. "1" is set in the number of MSs 507. This means that the RTP flow is encoded by the codec A, and the number of MSs using the RTP flow is one (=caller).

In Step 2002, the RTCP flow table 209 shown in FIG. 4 is configured. The content of the To header 1702 in the INVITE message 1302 is copied to the call group 400. The received packet information set in Step 2001 is set in the RTP 401. That is, the source IP address 501, the source UDP port 503, the destination IP address 504, and the destination UDP port 505 are set in the IP address 402, the UDP port 403, the IP address 404, and the UDP port 405, respectively. Flow information for talk burst control with respect to the RTP 401 is set in the RTCP 406. That is, the IP address 402 and the IP address 404 are copied to the IP address 407 and the IP address 409, respectively. The UDP port number "10010" of the RTCP indicated by the session information 1703 of the INVITE message 1302 is set in the UDP port 408. An unused UDP port number of the press-talk server 106 is set in the UDP port number 410.

In Step 2003, the Session Progress message 1304 is sent to the call control server 105. In the session information 1713 of the message, the UDP port 405 (in this example, 30001) as a UDP port number allocated to the RTP flow by the press-talk server 106, and the UDP port 410 (in this example, 30011) as a UDP port number allocated to the RTCP flow are set.

In Step 2004, the session information of all the codecs registered in the codec table 208 of FIG. 3 is set in the INVITE message 1320 to call the group members. Of these, the session information 1803a is information regarding a codec which is also used by the caller, and the UDP port numbers obtained in Steps 2001 and 2002 (in this example, 30001 for the RTP flow and 30011 for the RTCP flow) are set in the session information 1803a. For other session information 1803b, 1803c, and 1803d, new UDP port numbers for the RTP flow and the RTCP flow are obtained, and set in the INVITE message 1320.

In Step 2005, the address list 1804 of the group members under the same gateway is added to the end of the INVITE message, and a head group member in the list is copied to the To header 1802. In this example, the group members belonging to the group number 0003 are the mobile station 100a (corresponding to ms1@netA), the mobile station 100b (corresponding to ms2@netA), and the mobile station 100c (corresponding to ms3@netA), and the mobile station 100b and the mobile station 100c are under the gateway 104b. Therefore, the INVITE message to the group members is sent to only the gateway 104b (Step 2006).

Next, in FIG. 13B, a procedure when the OK response 1328 for the INVITE message 1320 is received from the call control server 105 will be described with reference to an INVITE OK receiving procedure 2010. In Step 2011, the To header 1812 is determined. In this case, since the To header 1812 is identical to the To header 1802 of the transmitted INVITE message 1320, the process progresses to Step 2012. In Step 2012, the session information 1813a of the OK response 1328 is set in the received packet information 502 of the press-talk table 211 shown in FIG. 5. That is, the IP address of the address (ms2@netA) indicated by the To header 1812 of the OK response 1327 is set in the source IP address 501. Since ms2@netA is a virtual SIP terminal on the gateway 104b, the address of the gateway 104b is set in the source IP address 501. Note that the press-talk server has found the address of the gateway 104b as that of ms2@netA in Step 1214 during location registration of the mobile station 100b. The UDP port "40001" of the session information 1813a is set in the source UDP port 503. The IP address of the press-talk server 106 is set in the destination IP address 504. The UDP port "30001" of the session information 1803a regarding the codec A in the INVITE message 1320 is set in the destination UDP port 505. The codec "A" of the session information 1813a is set in the codec 506. In setting the number of MSs 507, the address list 1814 is referred to. The address list 1814 relates to the gateway 104b and the mobile stations are classified by codec type in the address list 1814. It can be seen that only ms3 exists for the codec A, and thus the number of MSs 507 is set to 1. In this way, the session information 1813a is configured. With respect to the session information 1813b, in the same manner, the received packet information 502, the codec 506, and the number of MSs 507 of the press-talk table 211 are set.

In Step 2013, the RTCP flow table 209 shown in FIG. 4 is configured on the basis of the session information 1813a and 1813b. First, the session information 1813a will be described. The source IP address 501, the source UDP port 503, the destination IP address 504, and the destination UDP port 505 of the press-talk table 211 are set in the IP address 402, the UDP port 403, the IP address 404, and the UDP port 405 of the RTP 401, respectively. The IP address 402 and the IP address 404 are copied to the IP address 407 and the IP address 409 of the RTCP 406, respectively. The UDP port number (in this example, 40011) of the RTCP of the session information 1813a is set in the UDP port 408. The UDP port number (in this example, 30011) of the RTCP in the session information 1803a regarding the codec A in the INVITE message 1320 is set in the UDP port 410. In this way, the session information 1813a is configured. With respect to the session information 1813b, in the same manner, the RTCP flow table 209 is configured.

In Step 2014, since a plurality of codec are used by the press-talk call, the INVITE message 1329 is sent to the transcoder 107. The press-talk server 106 secures the UDP number of the RTP flow for transmission/reception with respect to the transcoder 107, and sets the session information 1903a and 1903b of the INVITE message 1329.

The procedure is performed in this way when the press-talk server 106 receives the OK response 1328 from the call control server 105.

Next, in FIG. 13B, a procedure when the press-talk server 106 receives the OK response 1330 from the transcoder 107 will be described with reference to the INVITE OK receiving procedure 2010. In Step 2011, since the To header 1912 is the address of the transcoder 107, the process progresses to Step 2015. In Step 2015, the session information 1913a and 1913b of the OK response 1330 is set in the received packet information 502 of the press-talk table 211 shown in FIG. 5. First, the session information 1913a will be described. The IP address of the address (transcoder.netA) indicated by the To header 1912 of the OK response 1330 is set in the source IP address 501. The UDP port "44001" of the session information 1913a is set in the source UDP port 503. The IP address of the press-talk server 106 is set in the destination IP address 504. The UDP port "33001" of the session information 1903a regarding the codec A set in the INVITE message 1329 is set in the destination UDP port 505. The codec "A" of the session information 1913a is set in the codec 506. The number of MSs 507 is set to 1, for convenience. In this way, the session information 1913a is configured. The session information 1913b is configured in the same manner.

In Step 2016, the transmission packet information 509 is configured in response to the received packet information 502 of the press-talk table 211 in FIG. 5. First, in case that the received packet information 502 is (source IP address, source UDP port, destination IP address, destination UDP port)=(gateway a, 10000, press-talk server, 30001), the transmission packet information 509 is set. Specifically, since the codec 506 of the RTP flow is "A", all the received packet information 502 with the codec 506 set to "A" are copied to the transmission packet information 509. In FIG. 5, since the RTP flow of the codec A is subject to control, the received packet information 502 including two types of information, (source IP address, source UDP port, destination IP address, destination UDP port)=(gateway b, 40001, press-talk server, 30001)

and (transcoder, 44001, press-talk server, 33001), are set in the transmission packet information 509. With respect to the caller's received packet information (source IP address, source UDP port, destination IP address, destination UDP port)=(gateway a, 10000, press-talk server, 30001), if a plurality of mobile stations using the codec A are under the gateway a, it is necessary to deliver the same flow to mobile stations other than the mobile station, which sends the RTP flow of the codec A. In FIG. 5, however, since the number of MSs 507 is 1, it is not necessary to set the caller's received packet information in the transmission packet information 509. If the number of MSs 507 is 2 or larger, (source IP address, source UDP port, destination IP address, destination UDP port)=(gateway a, 10000, press-talk server, 30001) is also set in the transmission packet information 509. In this way, when the received packet information 502 is (source IP address, source UDP port, destination IP address, destination UDP port)=(gateway a, 10000, press-talk server, 30001), the transmission packet information 509 is configured. In the same manner, the transmission packet information 509 for all the received packet information 502 is set.

In Step 2017, the talk burst table 210 shown in FIG. 4 is initialized. The content of the To header 1702 of the INVITE message 1302 is set in the call group 420. The source IP address 421, the source UDP port 422, the destination IP address 423, the destination UDP port 424, and the SSRC 425 are set to NULL.

In Step 2018, the sequence number table 212 is initialized. The content of the To header 1702 of the INVITE message 1302 is set in the call group 520. A value, for example, generated in a random manner is set in the sequence number 521.

In Step 2019, the OK response 1331 for the INVITE message 1303 is sent to the call control server 105. The procedure is performed in this way when the press-talk server 106 receives the OK response 1330 from the transcoder 107.

(2) Transcoder

Figure 21:
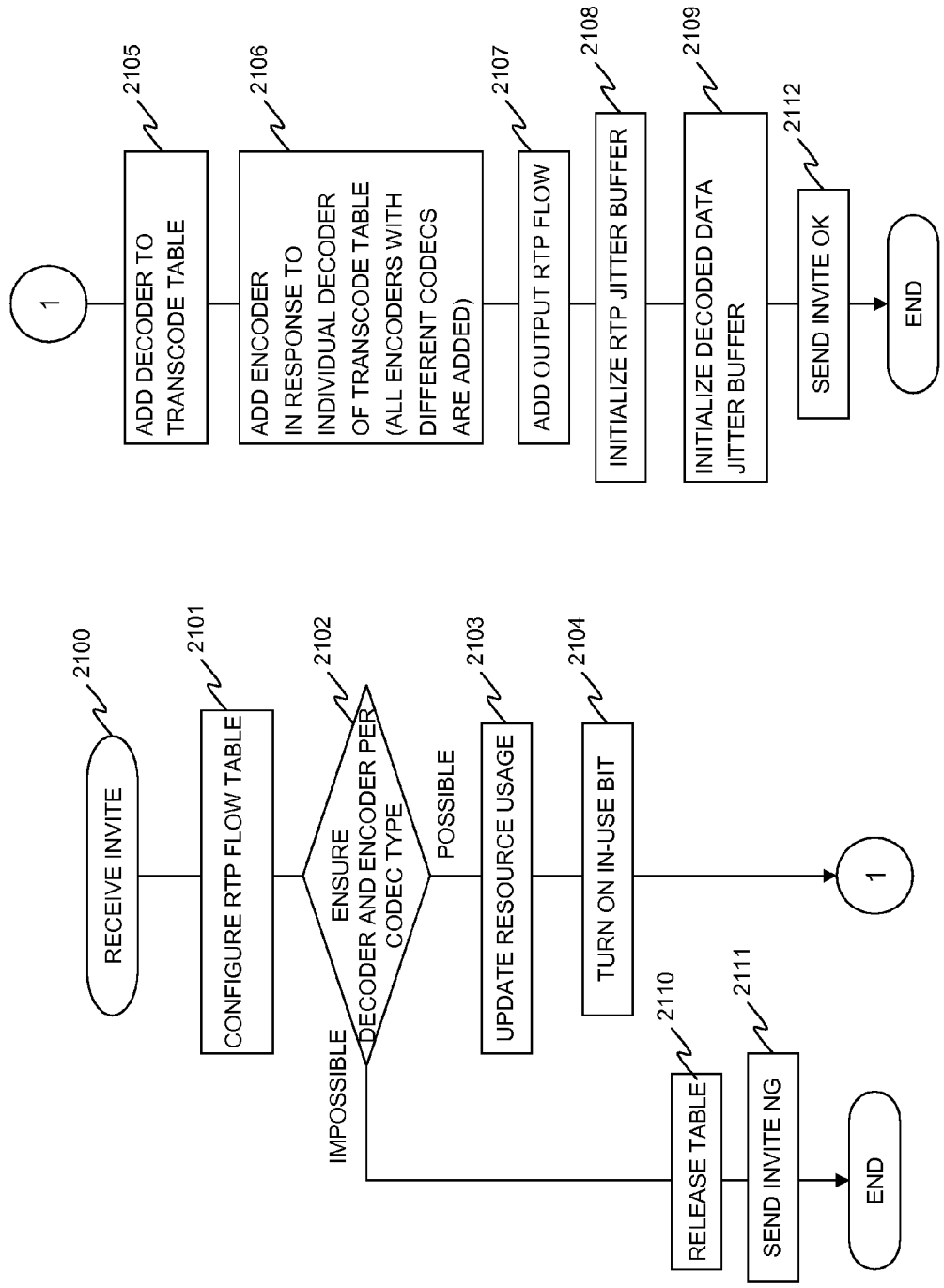
FIG. 21 is a diagram showing a call setup procedure flow of a transcoder.

FIG. 21 is a diagram showing a call setup procedure flow of a transcoder.

Next, in FIG. 13B, a procedure of the transcode control module 702 when the transcoder 107 receives the INVITE message 1329 from the press-talk server 106 will be described with reference to FIG. 21.

In Step 2101, the RTP flow table 707 shown in FIG. 9 is configured on the basis of the session information 1903a and 1903b in the INVITE message 1329 (see FIG. 13B). The content of the From header 1901 of the INVITE message 1329 is set in the call group 900. Next, in order to configure the session information, information regarding the session information 1903a is configured. The IP address of the press-talk server 106 is set in the IP address 905, the UDP port number (in this example, 33001) of the session information 1903a is set in the UDP port 906, and the codec (in this example, A) of the session information 1903a is set in the codec 907. The IP address of the transcoder 107 is set in the IP address 901, and an empty UDP port number (in this example, 44001) in the transcoder 107 is set in the UDP port 903. In this way, the session information 1903a is configured. The session information 1903b is also configured in the same manner.

In Step 2102, it is determined whether or not necessary codec circuits are all secured. All the codecs (in this example, A and B) in the codec 907 of the RTP flow table 707 shown in FIG. 9 are subject to determination. First, with respect to the codec A, the codec A is searched by the codec type 800 of the codec resource management table 705 shown in FIG. 8, and it is examined whether or not the usage 805 of each of the encoders and decoders of the codec A reaches the resource amount 803. When the usage 805 reaches the resource amount 803, no empty resource required for transcoding exists, and the process progresses to Step 2110. In Step 2110, the RTP flow table 707 is deleted, and an NG response for the INVITE message 1329 is sent to the press-talk server 106. In Step 2102, with respect to the codec B, the same examination is performed. Only when the codecs A and B all have idle encoders and decoders, the process progresses to Step 2103. In Step 2103, with respect to each of the codecs A and B, the encoder 806 and the decoder 807 of the usage 805 increment. In Step 2104, the codec in use map 706 is searched, an idle decoder and an idle encoder of the codec A and an idle decoder and an idle encoder of the codec B are selected, and an in-use bit is turned on. In Step 2105, the secured decoders are registered in the transcode table 708 shown in FIG. 9. The call group 900 of the RTP flow table 707 shown in FIG. 9 is copied to the call group 910. The UDP port 906 of the RTP flow table 707 is copied to the press-talk server UDP port 911. In this example, the UDP port 906 is 33001 and 33002. Since the UDP port 33001 is used in the RTP flow of the codec A, the decoder of the codec A is set in the decoder ID 912 (in this example, A001). Similarly, since the UDP port 33002 is used in the RTP flow of the codec B, the decoder of the codec B is set in the decoder ID 912 (in this example, B003). In Step 2106, the encoder ID 913 is set. First, an RTP flow in which the press-talk server UDP port 911 is 33001 will be described. In the RTP flow in which the UDP port 906 of the RTP flow table 707 is 33001, the codec 907 is "A". For this reason, the transcoder 107 needs to convert voice information according to a codec other than the codec A in the same call group 900. In this example, it can be seen from the codec 907 that only the codec B exists other than the codec A. Therefore, in Step 2106, the identifier of the secured encoder "B103" of the codec B is set in the encoder ID 913. When a codec A, a codec B, and a codec C are used in the same group, with respect to the UDP port 33001 as the flow of the codec A, two encoders including an encoder of the codec B and an encoder of the codec C are set in the encoder ID 913.

With respect to the RTP flow in which the press-talk server UDP port 911 is 33002, the encoder "A101" of the codec A is set in the same manner.

In Step 2107, with respect to the individual encoder ID 913 set in Step 2106, a UDP port number of the transcoder 107 corresponding to the codec type is set. For example, for a flow in which the encoder ID 913 is B103, since B103 corresponds to the codec B, an RTP flow in which the codec 907 of the RTP flow table 707 is B is searched, and the UDP port 903 of the transcoder 902 is set in the transcoder UDP port 914. Similarly, for the encoders registered in the encoder ID 913, the UDP port numbers of the RTP flow to send the encoding result are all registered.

In Step 2108, the RTP jitter buffer 709 shown in FIG. 10 is initialized. The call group 1000 and the press-talk server UDP port 1001 are copied from the call group 910 and the press-talk server UDP port 911 of the transcode table 708 shown in FIG. 9. The received sequence number 1002, the SSRC 1003, the next input time 1004, the next input timestamp 1005, the head pointer 1006, and the tail pointer 1007 are set to NULL.

In Step 2109, the decoded data jitter buffer 710 shown in FIG. 10 is initialized. The encoder ID 1010 is uniquely set with respect to all the encoders registered in the encoder ID 913 of the transcode table 708 shown in FIG. 9. The next input time 1011, the head pointer 1012, and the tail pointer 1013 are set to NULL.

In Step 2112, the OK response 1330 for the INVITE message 1329 is sent. The UDP port 903 of the RTP flow table 707 and the RTP clock rate 801 of the codec resource management table 705 are set in the session information 1913*a* and 1913*b* for every codec type.

The procedure is performed in this way when the transcoder 107 receives the INVITE message 1329 from the press-talk server 106.

3-3. Talk Burst Request

Figure 22:
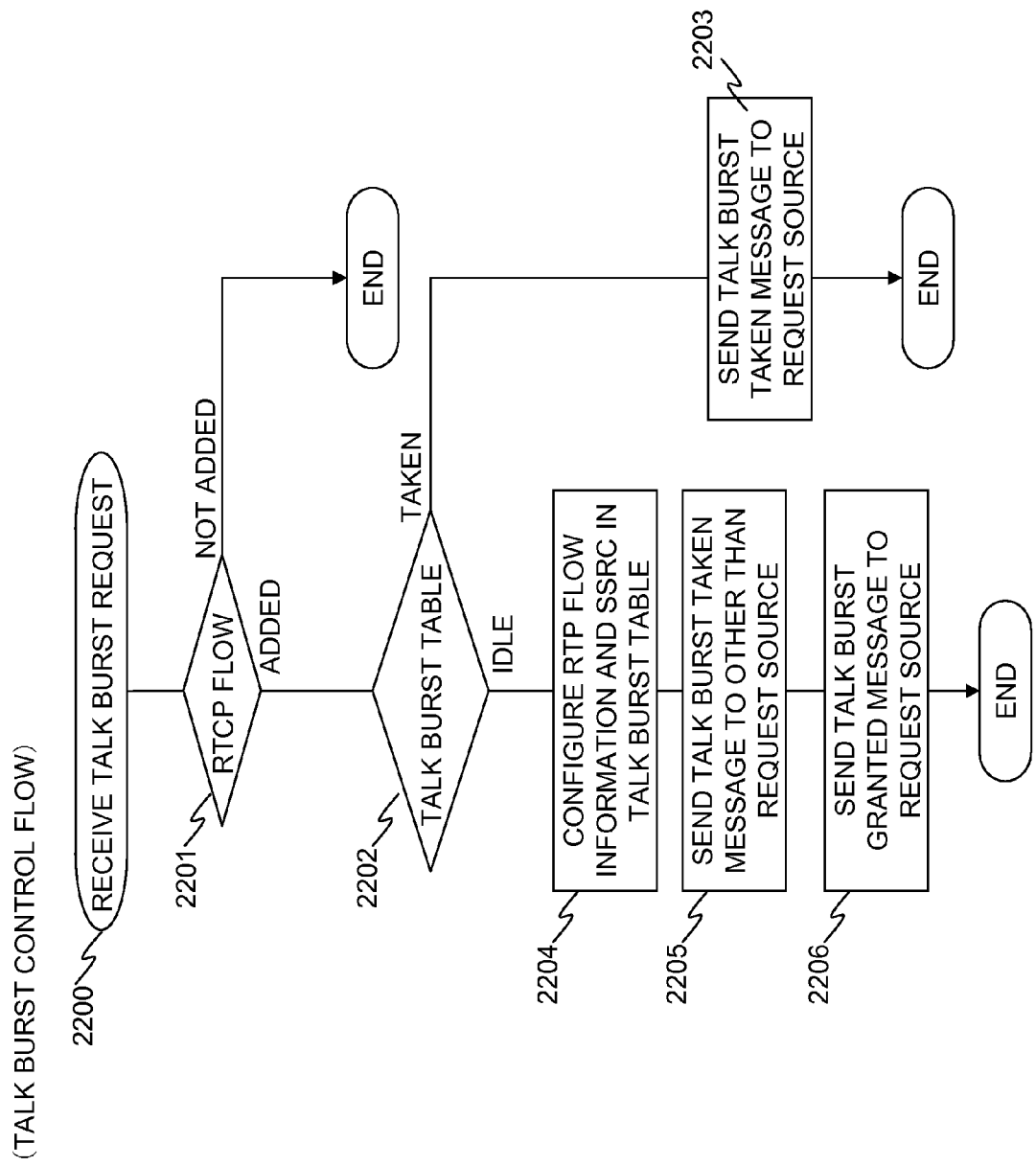
FIG. 22 is a diagram showing a talk burst control flow of a press-talk server.

FIG. 22 is a diagram a talk burst control flow of a press-talk server.

Finally, as shown in FIG. 15, a procedure when the press-talk server 106 receives the Talk Burst Request message 1502 from the gateway 104*a* after press-talk call setup is completed will be described with reference to FIG. 22.

First, in Step 2201, it is examined whether or not the source IP address, the source UDP port number, the destination IP address, and the destination UDP port number of the received Talk Burst Request message 1502 are registered in the RTCP 406 of the RTCP flow table 209 shown in FIG. 4. When no entry exists, the process ends. When the entries exist, in Step 2202, it is determined whether or not the SSRC 425 of the talk burst table 210 shown in FIG. 4 is NULL. If the SSRC 425 is not NULL, any mobile station takes the talk burst, and thus a not-granted message is sent to a request source (Step 2203). If the SSRC 425 of the talk burst table 210 is NULL, any mobile station does not request the talk burst yet, and thus the process progresses to Step 2204. In Step 2204, the RTP 401 in which the RTCP 406 of the RTCP flow table 209 is identical to the Talk Burst Request message 1502 is copied to the talk burst table 210. That is, the IP address 402, the UDP port 403, the IP address 404, and the UDP port 405 are copied to the source IP address 421, the source UDP port 422, the destination IP address 423, and the destination UDP port 424, respectively. The SSRC in the received Talk Burst Request message 1502 is set in the SSRC 425.

In Step 2205, the Talk Burst Taken message 1504 is sent to mobile stations other than the talk burst request source, and in Step 2206, the Talk Burst Granted message 1507 is sent to the talk burst request source. The procedure is performed in this way when the press-talk server 106 receives the Talk Burst Request message 1502 from the gateway 104*a*.

In this way, various tables are set in processing messages and the voice information can be appropriately transcoded when a mobile station sends voice information.

The invention is not limited to the mobile station, but it may be applied to various radio stations. In addition, the transcoder has been described, but the invention is not limited thereto. For example, the invention can be applied to various transcoders, such as a protocol transcoder and a media transcoder.

What is claimed is:

1. A press-talk server in a communication system which achieves a half-duplex many-to-many call among a plurality of radio stations, the press-talk server which delivers voice information sent by a sending station as a radio station, which requests a talk burst, to a plurality of other radio stations through a gateway and a base station while passing or without passing through a transcoder, wherein if a packet is received, the press-talk server searches a press-talk table that stores call group identification information as an identifier of a press-talk call, received packet information indicating socket information of a packet to be receivable by a call of a call group, a coding system, and transmission packet information indicating socket information of a packet carrying voice information of a radio station, which is currently taking the talk burst, and checks whether an entry identical to the socket information of the received packet exists in the received packet information, if an entry exists, the press-talk server determines whether a source address of the received packet is an address of the gateway or an address of the transcoder, when the received packet is a packet from the gateway, for the call group identification information, the press-talk server refers to a talk burst table that stores socket information of a packet, and a talk burst request identifier for identifying a radio station, which is currently taking the talk burst, when the socket information of the received packet and the talk burst request identifier in the received packet are identical to the entries of the talk burst table, the press-talk server determines that the received packet is a packet which is to be delivered to other group members, the press-talk server refers to the press-talk table, according to transmission packet information corresponding to the received packet information of the received packet, copies the received packet if the transmission packet information has a plurality of socket information, and creates a transmission packet to the gateway and/or transcoder, when the created transmission packet is to be transmitted to the transcoder, the press-talk server refers to a sequence number table that stores a sequence number to be added to a packet when being transmitted to the transcoder in association with the call group identification information, inserts the sequence number into the transmission packet, and increments the sequence number of the sequence number table, and the press-talk server sends the completed transmission packet.

2. The press-talk server according to claim 1, wherein, as a result of determination whether a source address of the received packet is an address of the gateway or an address of the transcoder, if it is determined that the source address of the received packet is the address of the transcoder, the press-talk server refers to the press-talk table, creates a packet on the basis of transmission packet information corresponding to received packet information, and the created packet is sent to the corresponding gateway.

3. The press-talk server according to claim 1, wherein all coding systems of coding conversion units in the transcoder are described in incoming messages to the radio stations.

4. A transcoder in the communication system which achieves a half-duplex many-to-many call among a plurality of radio stations, by a press-talk server which delivers voice information sent by a sending station as a radio station, which requests a talk burst, to a plurality of other radio stations through a gateway and a base station while passing or without passing through the transcoder, wherein:

on the basis of a packet received from the press-talk server, the transcoder refers to a jitter buffer that stores, with respect to call group identification information, a port number of the press-talk server, a received sequence number, and a talk burst request identifier for identifying a radio station, which is expected to currently have a talk burst, (a) when the port number of the press-talk server and the talk burst request identifier stored in the jitter buffer are not identical to a port number of the press-talk server and a talk burst request identifier of the received packet, (i) if the received sequence number of the jitter buffer is more up-to-date than the sequence number of the received packet, the transcoder determines that, after a radio station which has taken the talk burst is switched, an old packet before being switched is received, and discards the packet, and (ii) if the received sequence number of the jitter buffer is 0 or null, the transcoder determines that the received packet is an initial packet after press-talk call setup, or if the sequence number of the received packet is more up-to-date than the received sequence number of the jitter buffer, the transcoder determines that the received packet is an initial packet after the ratio station which has taken the talk burst is switched, the transcoder copies the value of the sequence number of the received packet to the received sequence number of the jitter buffer, and copies the talk burst request identifier of the received packet to the talk burst request identifier of the jitter buffer, thereby newly construct a buffer of the jitter buffer, and (b) when the port number of the press-talk server and the talk burst request identifier stored in the jitter buffer are identical to the port number of the press-talk server and the talk burst request identifier in the received packet, the transcoder compares the sequence number of the received packet and the received sequence number of the jitter buffer, if the sequence number of the received packet is larger, sets the value of the sequence number of the received packet in the received sequence number of the jitter buffer, inserts the received packet in an input wait queue of an input buffer to a coding conversion unit so as to be arranged in ascending order of a timestamp from the head of the queue, and converts the received packet from a first coding system to a second coding system by the coding conversion unit.

5. The transcoder according to claim 4, wherein, if a packet is received from the press-talk server, a flow table that stores, with respect to call group identification information, an address and a port number to be used by the transcoder, an address to be used by the press-talk server, and a coding system is searched, and it is determined whether or not an entry of a port number of a packet of the first coding system received from the press-talk server exists in the flow table, and if no entry exists in the flow table, the received packet is discarded.

6. The transcoder according to claim 4, wherein, with reference to a transcode table that stores, for the call group identification information, a press-talk server port number, a decoder ID indicating a decoder, to which a received flow of the press-talk server indicated by the press-talk server UDP port number is to be input, an encoder ID indicating an encoder, to which voice information output from a decoder corresponding to the decoder ID is to be input, and a transcoder port number indicating a flow to send voice information output from an encoder corresponding to the encoder ID, the received packet from the input buffer is decoded by the decoder corresponding to the decoder ID on the basis of the call group identification information and the press-talk server port number, and is encoded by the encoder corresponding to the encoder ID, thereby creating a transmission packet, and the created transmission packet is sent to a network.

7. The transcoder according to claim 4, wherein, when the radio station having granted the talk burst is switched to another radio station, the voice information of the radio station before being switched is discarded.

8. The transcoder according to claim 4, wherein, after voice information is converted by the coding conversion unit, a coding system of voice information of an originating station currently selected is identified, and when the coding system is different from a coding system of the coding conversion unit, the converted voice information is discarded.

9. The transcoder according to claim 4, wherein, when voice information is not receivable from a radio station, and subsequently no voice information is input to the coding conversion unit, dummy data is input to the coding conversion unit.

10. A communication system which achieves a half-duplex many-to-many call among a plurality of radio stations, by a press-talk server that delivers voice information sent by a sending station as a radio station, which requests a talk burst, to a plurality of other radio stations through a gateway and a base station while passing or without passing through a transcoder, wherein if a packet is received, the press-talk server searches a press-talk table that stores call group identification information as an identifier of a press-talk call, received packet information indicating socket information of a packet to be receivable by a call of a call group, a coding system, and transmission packet information indicating socket information of a packet carrying voice information of a radio station, which is currently taking the talk burst, and checks whether an entry identical to the socket information of the received packet exists in the received packet information, if an entry exists, the press-talk server determines whether a source address of the received packet is an address of the gateway or an address of the transcoder, when the received packet is a packet from the gateway, for the call group identification information, the press-talk server refers to a talk burst table that stores socket information of a packet, and a talk burst request identifier for identifying a radio station, which is currently taking the talk burst, when the socket information of the received packet and the talk burst request identifier in the received packet are identical to the entries of the talk burst table, the press-talk server determines that the received packet is a packet which is to be delivered to other group members, the press-talk server refers to the press-talk table, according to transmission packet information corresponding to the received packet information of the received packet, copies the received packet if the transmission packet information has a plurality of socket information, and creates a transmission packet to the gateway and/or transcoder, when the created transmission packet is to be transmitted to the transcoder, the press-talk server refers to a sequence number table that stores a sequence number to be added to a packet when being transmitted to the transcoder in association with the call group identification information, inserts the sequence number into the transmission packet, and increments the sequence number of the sequence number table, and the press-talk server sends the completed transmission packet, and wherein on the basis of a packet received from the press-talk server, the transcoder refers to a jitter buffer that stores, with respect to call group identification information, a port number of the press-talk server, a received sequence number, and a talk burst request identifier for identifying a radio station, which is expected to currently have a talk burst, (a) when the port number of the press-talk server and the talk burst request identifier stored in the jitter buffer are not identical to a port number of the press-talk server and a talk burst request identifier of the received packet, (i) if the received sequence number of the jitter buffer is more up-to-date than the sequence number of the received packet, the transcoder determines that, after a radio station which has taken the talk burst is switched, an old packet before being switched is received, and discards the packet, and (ii) if the received sequence number of the jitter buffer is 0 or null, the transcoder determines that the received packet is an initial packet after press-talk call setup, or if the sequence number of the received packet is more up-to-date than the received sequence number of the jitter buffer, the transcoder determines that the received packet is an initial packet after the ratio station which has taken the talk burst is switched, the transcoder copies the value of the sequence number of the received packet to the received sequence number of the jitter buffer, and copies the talk burst request identifier of the received packet to the talk burst request identifier of the jitter buffer, thereby newly construct a buffer of the jitter buffer, and (b) when the port number of the press-talk server and the talk burst request identifier stored in the jitter buffer are identical to the port number of the press-talk server and the talk burst request identifier in the received packet, the transcoder compares the sequence number of the received packet and the received sequence number of the jitter buffer, if the sequence number of the received packet is larger, sets the value of the sequence number of the received packet in the received sequence number of the jitter buffer, inserts the received packet in an input wait queue of an input buffer to a coding conversion unit so as to be arranged in ascending order of a timestamp from the head of the queue, and converts the received packet from a first coding system to a second coding system by the coding conversion unit.

11. The communication system according to claim 10, wherein, as a result of determination whether a source address of the received packet is an address of the gateway or an address of the transcoder, if it is determined that the source address of the received packet is the address of the transcoder, the press-talk server refers to the press-talk table, creates a packet on the basis of transmission packet information corresponding to received packet information, and sends the created packet to the corresponding gateway.

12. The communication system according to claim 10, wherein the press-talk server describes all coding systems of coding conversion units in the transcoder in incoming messages to the radio stations.

13. The communication system according to claim 10, wherein, if the transcoder receives a packet from the press-talk server, the transcoder searches a flow table that stores, with respect to call group identification information, an address and a port number to be used by the transcoder, an address to be used by the press-talk server, and a coding system, and the transcoder determines whether or not an entry of a port number of a packet of the first coding system received from the press-talk server exists in the flow table, and if no entry exists in the flow table, the transcoder discards the received packet.

14. The communication system according to claim 10, wherein, with reference to a transcode table that stores, for the call group identification information, a press-talk server port number, a decoder ID indicating a decoder, to which a received flow of the press-talk server indicated by the press-talk server UDP port number is to be input, an encoder ID indicating an encoder, to which voice information output from a decoder corresponding to the decoder ID is to be input, and a transcoder port number indicating a flow to send voice information output from an encoder corresponding to the encoder ID, the transcoder decodes the received packet from the input buffer by the decoder corresponding to the decoder ID on the basis of the call group identification information and the press-talk server port number, and encodes by the encoder corresponding to the encoder ID, thereby creates a transmission packet, and sends the created transmission packet to a network.

15. The communication system according to claim 10, wherein, when the radio station having granted the talk burst is switched to another radio station, the transcoder discards the voice information of the radio station before being switched.

16. The communication system according to claim 10, wherein, after voice information is converted by the coding conversion unit, the transcoder identifies a coding system of voice information of an originating station currently selected, and when the coding system is different from a coding system of the coding conversion unit, the transcoder discards the converted voice information.

17. The communication system according to claim 10, wherein, when voice information is not receivable from a radio station, and subsequently no voice information is input to the coding conversion unit, the transcoder inputs dummy data to the coding conversion unit.

\* \* \* \* \*